US011885618B2

(12) United States Patent
Ma et al.

(10) Patent No.: US 11,885,618 B2
(45) Date of Patent: Jan. 30, 2024

(54) THREE-AXIS MICROMACHINED GYROSCOPE

(71) Applicant: AAC Kaitai Technologies (Wuhan) CO., LTD, Hubei (CN)

(72) Inventors: Zhao Ma, Shenzhen (CN); Zhan Zhan, Shenzhen (CN); Shan Yang, Shenzhen (CN); Xiao Kan, Shenzhen (CN); Yang Li, Shenzhen (CN); Veronica Tan, Singapore (SG); Yan Hong, Shenzhen (CN); Kahkeen Lai, Singapore (SG)

(73) Assignee: AAC KAITAI TECHNOLOGIES (WUHAN) CO., LTD, Wuhan (CN)

( * ) Notice: Subject to any disclaimer, the term of this patent is extended or adjusted under 35 U.S.C. 154(b) by 189 days.

(21) Appl. No.: 17/566,706

(22) Filed: Dec. 31, 2021

(65) Prior Publication Data

US 2022/0316882 A1 Oct. 6, 2022

(30) Foreign Application Priority Data

Apr. 2, 2021 (CN) .......................... 202110362578.1

(51) Int. Cl.
G01C 19/5712 (2012.01)
(52) U.S. Cl.
CPC .............................. G01C 19/5712 (2013.01)
(58) Field of Classification Search
CPC ............ G01C 19/5712; G01C 19/5656; G01C 19/5649; G01C 19/5663
See application file for complete search history.

(56) References Cited

U.S. PATENT DOCUMENTS

| 2007/0214883 | A1* | 9/2007 | Durante | G01C 19/5712 73/504.04 |
| 2009/0064780 | A1* | 3/2009 | Coronato | G01P 15/125 73/504.08 |
| 2009/0100930 | A1* | 4/2009 | Coronato | G01P 15/14 73/504.12 |
| 2014/0352431 | A1* | 12/2014 | Leclerc | G01P 15/18 73/504.04 |
| 2018/0216935 | A1* | 8/2018 | Senkal | G01C 19/5762 |
| 2018/0245920 | A1* | 8/2018 | Laghi | G01C 19/5712 |
| 2019/0346266 | A1* | 11/2019 | Kuisma | G01C 19/5684 |
| 2020/0109945 | A1* | 4/2020 | Kuisma | G01C 19/5684 |
| 2020/0263987 | A1* | 8/2020 | Blomqvist | G01C 19/574 |

* cited by examiner

*Primary Examiner* — David J Bolduc
(74) *Attorney, Agent, or Firm* — W&G Law Group

(57) ABSTRACT

One of the objects of the present invention is to provide a three-axis micromachined gyroscope which improves the detection sensitivity for detecting angular velocity. Accordingly, the present invention provides a three-axis micromachined gyroscope, including: a base; a vibration part suspended by the base, including a vibration assembly for receiving Coriolis force and generating a position change; a drive electrode for driving the vibration part; a detection part connected with the vibration part for detecting position change of the weights after receiving Coriolis force, and converting the position change of the weight into an electrical signal for outputting; and a swing center of each weight being outside the corresponding weight. When the three-axis micromachined gyroscope receives an angular velocity, the swinging weight is subjected to Coriolis force and a corresponding position change occurs.

10 Claims, 17 Drawing Sheets

Use the drive electrode to drive the four masses to swing in a plane parallel to the base. Wherein, the first weight and the second weight swing concentrically in anti-phase. The third weight and the fourth weight swing in concentrically anti-phase. The swing of the first weight and the swing of the third weight are in anti-phase ⟋501

Receive angular velocity, so that the four weights are subjected to Coriolis force, and the position changes under the action of Coriolis force ⟋502 the detection part detects the position changes of the four weights in the Coriolis force direction, and converts the position changes into electrical signal output ⟋503

Calculate the angular velocity as described in the electrical signal ⟋504

Fig.17

THREE-AXIS MICROMACHINED GYROSCOPE

FIELD OF THE PRESENT DISCLOSURE

The present invention relates to gyroscopes, in particular to a three-axis micromachined gyroscope.

DESCRIPTION OF RELATED ART

A related micromechanical gyroscope, namely MEMS gyroscope, can realize the detection of angular velocity as described in the generation principle of Coriolis force. Angular velocity in any direction can be decomposed along X axis, Y axis and Z axis in a rectangular coordinate system. The three-axis gyroscope refers to the micro-mechanical gyroscope with the ability to measure the angular velocity of the X axis, Y axis and Z axis directions. Therefore, the three-axis gyroscope can measure the direction and magnitude of any angular velocity in space. However, when detecting angular velocity, the three-axis gyroscope has the problem of low detection sensitivity.

Therefore, it is necessary to provide an improved three-axis micromachined gyroscope to solve the above problems.

SUMMARY OF THE PRESENT INVENTION

One of the objects of the present invention is to provide a three-axis micromachined gyroscope which improves the detection sensitivity for detecting angular velocity.

To achieve the above-mentioned objects, the present invention provides a three-axis micromachined gyroscope, including: a base; a vibration part suspended by the base, including a vibration assembly for receiving Coriolis force and generating a position change; a drive electrode for driving the vibration part; a detection part connected with the vibration part for detecting position change of the weights after receiving Coriolis force, and converting the position change of the weight into an electrical signal for outputting; and a swing center of each weight being outside the corresponding weight.

The vibration assembly includes four weights symmetrically distributed and connected to each other for swing in a plane parallel to the base driven by the drive electrode. The four weights include a first weight, a second weight, a third weight, and a fourth weight; when the gyroscope is stationary. The first weight and the third weight are symmetrical with respect to a first axis. The second weight and the fourth weight are symmetrical with respect to the first axis. The first weight and the second weight are symmetrical with respect to a second axis perpendicular to the first axis; and the third weight and the fourth weight are symmetrical with respect to the second axis. When the three-axis micromachined gyroscope receives an angular velocity, the swinging weight is subjected to Coriolis force and a corresponding position change occurs.

Further, the drive electrode drives the first weight and the second weight to swing in anti-phase; the drive electrode drives the third weight and the fourth weight to swing in anti-phase; the swing of the first weight and the swing of the third weight are in anti-phase.

When the three-axis micromachined gyroscope receives the angular velocity in the first axis direction, the four weights all rotate around the second axis; an overturn of the first weight and an overturn of the second weight are in same phase; an overturn of the third weight and an overturn of the fourth weight are in same phase; the overturn of the first weight and the overturn of the third weight are in anti-phase; when the three-axis micromachined gyroscope receives the angular velocity in the second axis direction, the four weights all perform overturning movements around their respective flip axis; the flip axis passes through the swing center of the weight and is parallel to the first axis; the overturn of the first weight and the overturn of the second weight are in anti-phase; the overturn of the third weight and the overturn from the overturn of the fourth weight are in anti-phase; the overturn of the first weight and the overturn of the third weight are in anti-phase.

When the three-axis micromachined gyroscope receives an angular velocity that is perpendicular to both the first axis and the third axis of the second axis, the four weights all move along the first axis; the movement of the first weight and the movement of the second weight are in same phase; the movement of the third weight and the movement of the fourth weight. are in same phase; the movement of the first weight and the movement of the third weight are in anti-phase.

Further, the drive electrode drives the first weight and the second weight to swing in same phase; the drive electrode drives the third weight and the fourth weight to swing in same phase; wherein, the swing of the first weight and the third weight are in anti-phase.

When the three-axis micromachined gyroscope receives the angular velocity in the first axis direction, the four weights all rotate around the second axis; an overturn of the first weight and the overturn of the second weight are in anti-phase; an overturn of the third weight and the overturn of the fourth weight are in anti-phase; the overturn of the first weight and the overturn of the third weight are in anti-phase; when the three-axis micromachined gyroscope receives the angular velocity in the second axis direction, the four weights all perform a overturning movement around the flip axis; the flip axis passes through the swing center of the weight and is parallel to the first axis; the overturn of the first weight is in same phase with the overturn of the second weight, and the overturn of the third weight is in same phase with the overturn of the fourth weight; the overturn of the first weight and the overturn of the third weight are in anti-phase.

When the three-axis micromachined gyroscope receives an angular velocity that is perpendicular to the third axis direction of the first axis and the second axis at the same time, the four weights all move in the direction of the first axis; the movement of the first weight and the movement of the second weight are in anti-phase; the movement of the third weight and the movement of the fourth weight are in anti-phase; the movement of the first weight and the movement of the third weight are in anti-phase.

Further, the vibration part further includes a fixing assembly for connecting the four weights to the base; the fixing assembly includes two anchors for connecting the four weights and the base; the two anchors include a first anchor and a second anchor that are arranged along the second axis and distributed about the first axial symmetry.

The first weight and the second weight are both connected to the base through the first anchor; the third weight and the fourth weight are both connected to the base through the second anchor. The first weight and the second mass both swing concentrically with the first anchor as the swing center; the third weight and the fourth weight both swing concentrically with the second anchor as the swing center.

Further, the vibration part further includes a connection assembly for connecting the four weights; the connection assembly includes an inner coupling member that connects each weight to the anchor corresponding to it; the inner coupling member includes a first decoupling structure, a fourth connection beam connecting the anchor and the first decoupling structure, a fifth connection beam connecting the first decoupling structure and the weight.

When the drive electrode drives the weight to swing, the fourth connection beam and the first decoupling structure swing around the anchor; the first decoupling structure drives the weight to swing around the anchor through the fifth connection beam.

When the three-axis micromachined gyroscope receives the angular velocity in the first axis direction and the second axis direction, the fourth connection beam and the first decoupling structure do not move with the weight under the action of Coriolis; when the three-axis micromachined gyroscope receives an angular velocity that is perpendicular to the first axis and the third axis of the second axis at the same time, the fourth connection beam and the first decoupling structure do not move with the weight under the action of Coriolis force motion.

Further, the connection assembly further includes a first connection rod and a second connection rod distributed relative to the second axial symmetry; the first connection rod is arranged on a side of the first weight and the third weight away from the two anchors; the first connection rod is used to connect the first weight and the third weight; the fixing assembly further includes a first support point located at the midpoint of the first connection rod; the first support point is used to connect the first connection rod and the base.

The second connection rod is arranged on a side of the second weight and the fourth weight away from the two anchors; the second connection rod is used to connect the second weight and the fourth weight; the fixing assembly further includes a second support point located at the midpoint of the second connection rod; the second support point is used to connect the second connection rod and the base.

Further, the connection assembly further includes four first connection beams and four outer coupling members for connecting the connection rod and the weight; each outer coupling member is connected to one of the first connection beams; each of the connection rods is connected to two of the first connection beams; each of the weights is connected to one of the first connection beams; and the first connection beam is located on the flip axis of each weight.

The first connection beam includes a fixed part connected with the connection rod, and an extension part separated from the fixed part and connected with the weight; the outer coupling member includes a second decoupling structure connected between the fixed part and the extension part, a sixth connection beam connecting the rear end of the second decoupling structure and the base.

When the drive electrode drives the weight to swing, the second decoupling structure, the fixed part, and the connection rod do not swing with the weight; when the three-axis micromachined gyroscope receives the angular velocity in the first axis direction and the second axis direction, the second decoupling structure, the fixed part, and the connection rod do not move with the weight under the action of Coriolis; when the three-axis micromachined gyroscope receives the angular velocity in the third axis direction, the second decoupling structure, the fixed part, and the connection rod move in the first axis direction.

Further, the drive electrode is arranged on each of the first decoupling structures.

In addition, the detection part includes multiple Z axis detection units for detecting changes in the positions of the four weights when the three-axis micromachined gyroscope receives angular velocities that are simultaneously perpendicular to the third axis of the first axis and the second axis. The Z axis detection unit is arranged on the second decoupling structure.

The present invention further provides a measuring method of angular velocity applied to a three-axis micromachined gyroscope, including a base, a vibration part connected to the base and suspended on the base, a drive electrode connected with the driving vibration part, and a detection part connected with the vibration part, the vibration part including a vibration assembly for receiving Coriolis force and generating a position change. The vibration assembly including four weights, and the method includes steps of:

using the drive electrode to drive the four weights to swing in a plane parallel to the base; a first weight and a second weight swing concentrically in anti-phase; a third weight and a fourth weight swing in concentrically anti-phase; the swing of the first weight and the swing of the third weight are in anti-phase; or, the first weight and the second weight swing concentrically in same phase; the third weight and the fourth weight swing concentrically and in same phase; the swing of the first weight and the swing of the third weight are in anti-phase;

receiving an angular velocity for providing the four weights with Coriolis force such that position changes under the action of Coriolis force;

detecting position changes of the four weights in the Coriolis direction by the detection part, and converting the position changes into electrical signal output;

calculating the angular velocity according to the electrical signal.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

FIG. 17 is a flow chart of an angular velocity measurement method provided by the present invention.

Figure 1:
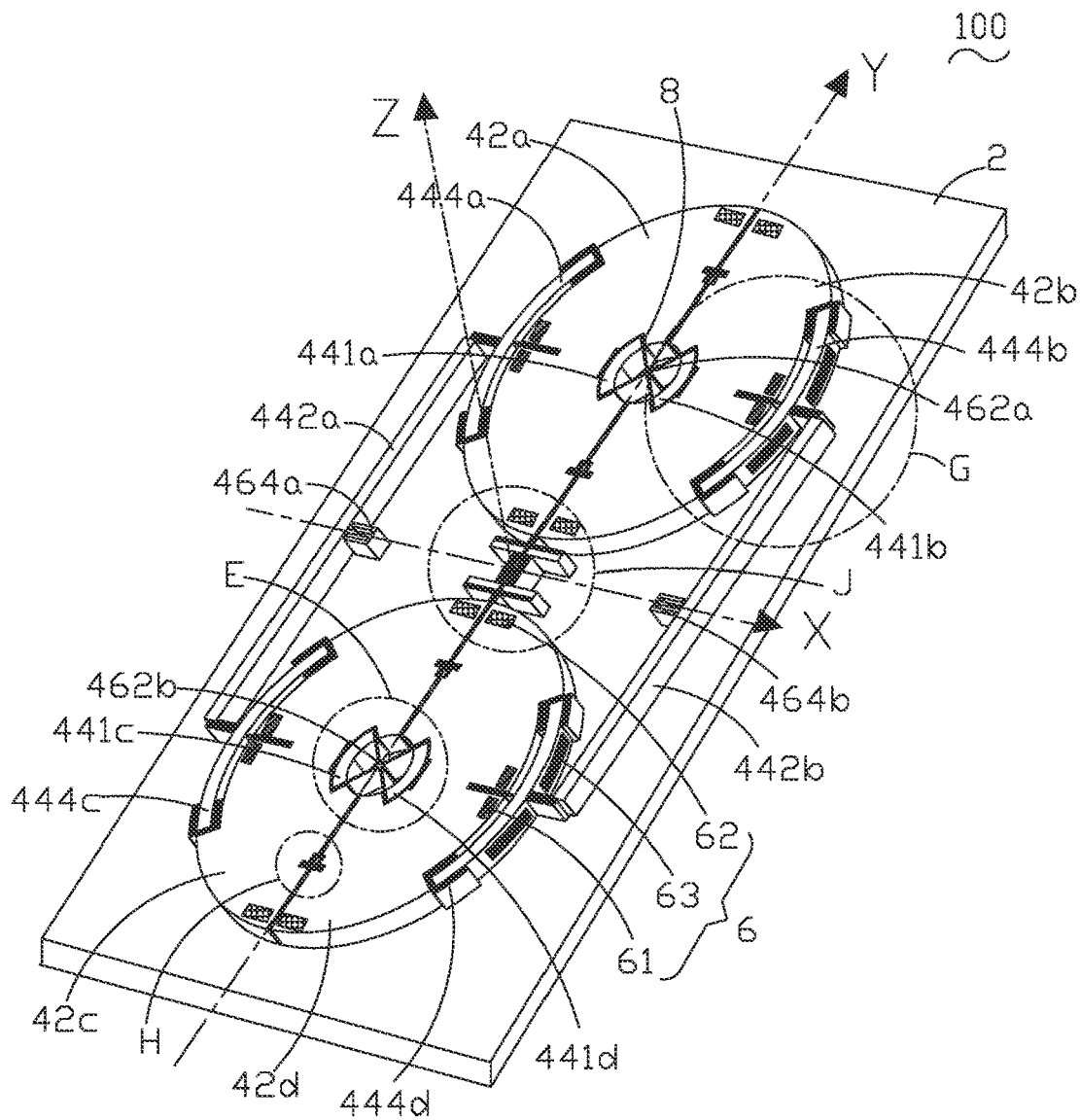
FIG. 1 is an isometric view of a three-axis micromachined gyroscope provided by an exemplary embodiment of the present invention.
Figure 1:
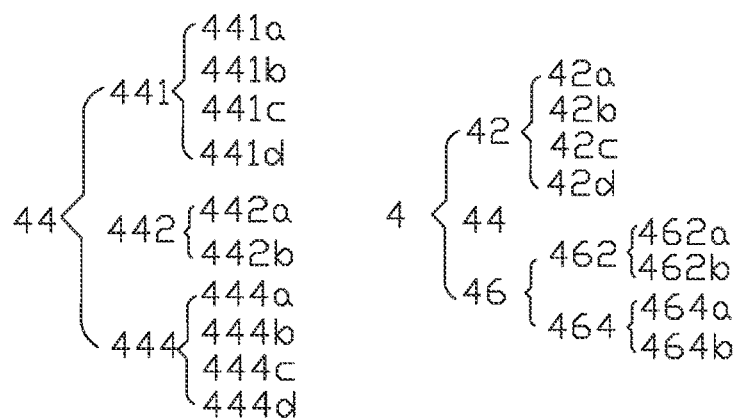

DESCRIPTION OF EXEMPLARY EMBODIMENTS right-hand rule. Observe the weight while standing in the rotation system. In addition to maintaining the original motion, the weight also produces displacement in the direction of Coriolis force. This state of motion is called a detection mode. The detection part can detect the position change of the weight in the Coriolis force direction, and convert the position change into an electrical signal for output. By measuring the displacement of the weight in the Coriolis force direction, the angular velocity can be calculated and calculated to realize the detection of the angular velocity.

The base 2 in the micromechanical gyroscope is used to provide support for the vibration part 4. The vibration part 4 is connected to base 2 and suspended above the base 2. Vibration part 4 is used to sense external rotation, accept external angular velocity input, generate Coriolis force, and produce displacement in the direction of Coriolis force. Vibration part 4 enters drive mode status under the action of drive electrode 8. Detection part 6 is used to detect the position change of the vibration part 4 in the Coriolis force direction, and convert the position change of the weight into an electrical signal output.

The vibration part 4 includes four weights symmetrically distributed in pairs. The four weights can be driven by the drive electrode 8 to swing. The swing center of each weight is outside the weight. When the three-axis micromachined gyroscope 100 receives the angular velocity, the swinging weight is subjected to Coriolis force and a corresponding position change occurs. The detection part 6 is used to detect the position change of each weight after receiving Coriolis force, and convert the position change of each weight into an electrical signal for output.

Figure 2:
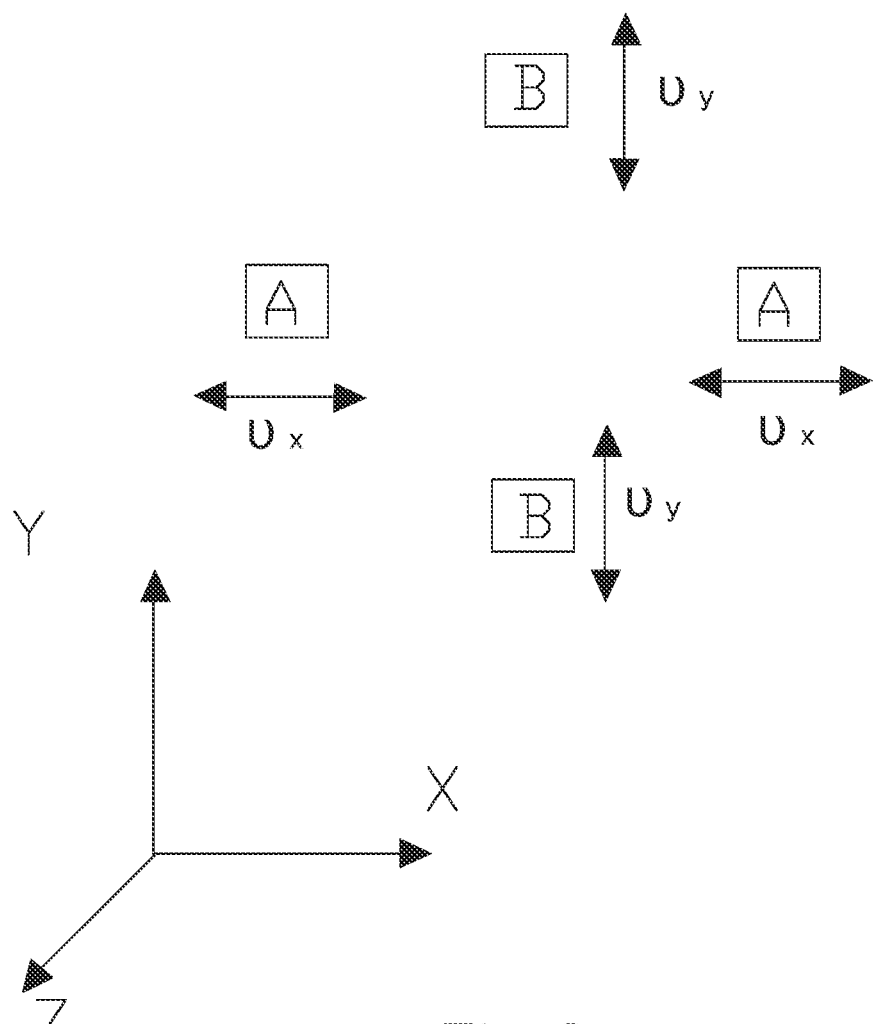
FIG. 2 is a schematic view of a drive mode status of four-weight three-axis gyroscope in a related art.

It should be noted that the direction of Coriolis force received by the weight is related to the direction of movement of the weight in drive mode status and the direction of the angular velocity to be measured. When the input angular velocity is parallel to the movement direction of the weight in drive mode status, the Coriolis force size is zero, that is, the weight is not affected by Coriolis force. Please refer to FIG. 2. FIG. 2 is a schematic view of the drive mode status of the four-weight three-axis gyroscope in the related art. In the related art, for example, the drive mode status of weight a is arranged to reciprocate along a straight line of X axis.

As described in the right-hand rule, when the direction of the angular velocity to be measured is the Y axis direction, the direction of Coriolis force received by weight a is the Z axis direction perpendicular to the XY plane. When the direction of the angular velocity to be measured is also the X axis direction, and the direction of the angular velocity to be measured is parallel to the movement direction of weight A, weight a will not be affected by Coriolis force. In this case, weight a cannot be used to measure the angular velocity in the X axis direction. In order to realize the detection of the X axis angular velocity, a weight B that reciprocates linearly along the Y axis is generally added to measure the angular velocity in the X axis direction. When the angular velocity direction to be measured is the X axis direction, only weight B is affected by Coriolis force and changes its position. While weight a is not affected by Coriolis force, it will continue to maintain a straight reciprocating movement along the X axis direction. Therefore, the detection part cannot detect the position change of weight a and output an electrical signal. At this time, weight a is in an idle state and cannot contribute to the output of the electrical signal. When the angular velocity direction to be measured is the Z axis direction perpendicular to both X axis and Y axis, the Coriolis force received by weight a is along the Y axis direction, and the Coriolis force received by weight B is along the X axis direction. Therefore, although the gyroscope in the prior art can measure the angular velocity of X axis, Y axis and Z axis, when measuring the angular velocity of a certain direction (such as X axis and Y axis), not all weights can participate Corinthians movement. Some weights are not affected by Coriolis force and are left unused, which in turn causes the sensitivity of the gyroscope to be low. This also limits the improvement of gyroscope detection efficiency to a certain extent.

Figure 3:
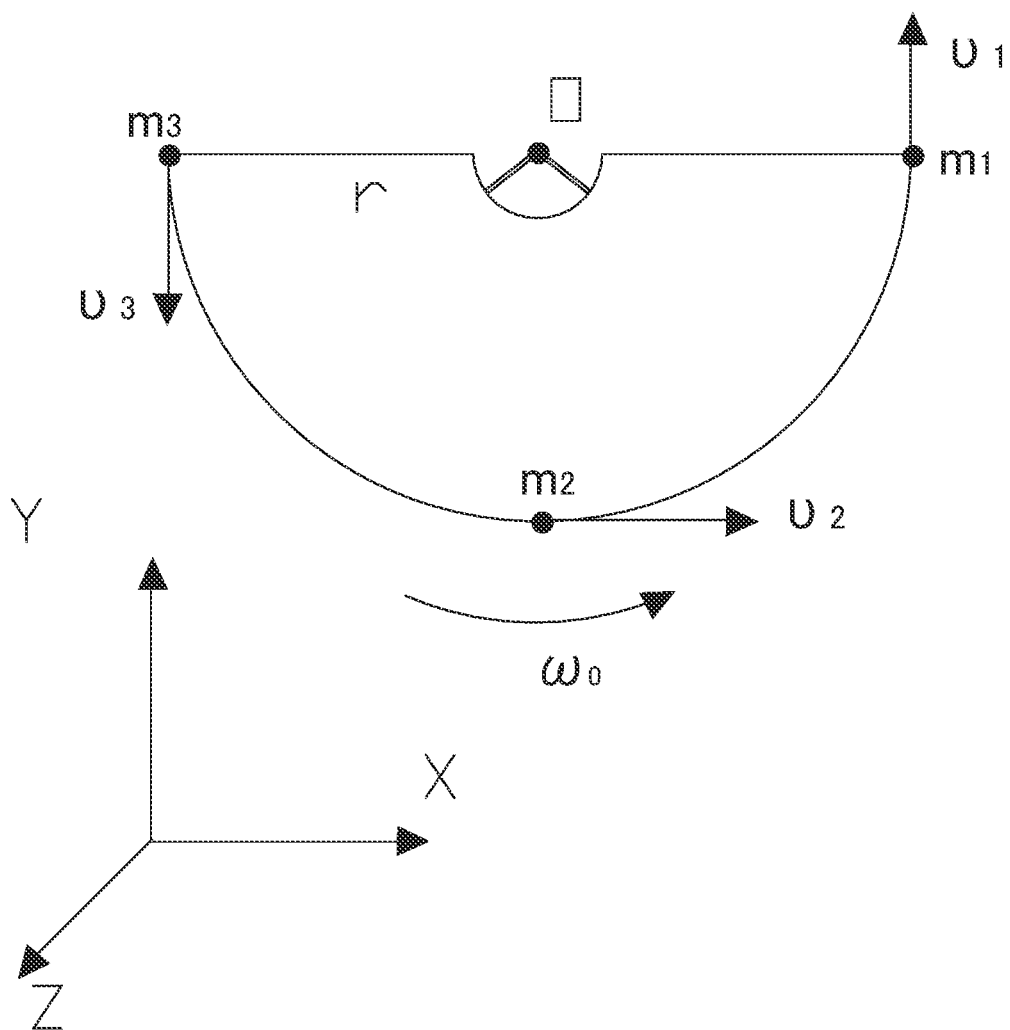
FIG. 3 is a schematic view of a drive mode status of the weight in the present invention.

The drive mode status of weight provided in the present invention is the swing in a plane parallel to base. Please refer to FIG. 3, which is a schematic view of the drive mode status of the weight in the present invention. The shape of the weight in the swing plane is a semicircular shape. It should be noted that, because the semicircular weight has no mass distribution at the center of circle, the center of circle of the semicircular weight is outside the weight. Set an anchor connected to the base at the center of circle. The weight of the semiconductor shape and the anchor located in the center of circle thereof are connected by beams. It is understandable that when the drive mode status of the weight of the semiconductor shape is a swing around the center of circle O (anchor) at an angular velocity ω0; (the center of the swing coincides with the center of circle O of the semiconductor shape weight, that is, the swing center of weight is not on weight), and the speed of each point on weight is different; the linear velocity is equal to the multiplication amount of angular velocity and radius ($\upsilon=\omega 0 \times r$). The movement direction of the mass point on the weight is perpendicular to the line between this point and the center of circle, and the speed is related to the distance from this point to the center of circle. Exemplarily, when the weight swings back and forth around the center of circle O, at a certain moment, the weight moves counterclockwise. The movement directions $\upsilon 1$ and $\upsilon 3$ of the endpoints m1 and m3 on the weight are the Y axis direction. The movement direction $\upsilon 2$ of the midpoint m2 on the weight is the X axis direction. Therefore, when the angular velocity along the X axis direction is input, m1 and m3 can be subjected to Coriolis force. m2 is not subject to Coriolis force. When the angular velocity along the Y axis is input, m2 can be affected by Coriolis force in the Z axis direction, while m1 and m3 are not affected by Coriolis force. When inputting the angular velocity of Z axis which is perpendicular to both X axis and Y axis at the same time, every point in the weight can be affected by Coriolis force.

In addition, it should be noted that when the weight is semicircular, the center of circle of the semicircular weight is located on the edge of the semicircular weight, that is, the center of circle of the semicircular weight is not located above the weight. When the semicircular weight swings around the center of circle at its edge, when measuring the angular velocity in any direction, there are always some mass points in the semicircular weight that can receive Coriolis force, that is, the angular velocity in any direction can be measured.

Therefore, in the swinging weight, different mass points have different moving directions. There are always some mass points in the swinging weight that can be Coriolis force, and then drive the entire weight movement. But it should be noted that the swing center of weight needs to be outside of weight. That is, the swing center of the weight can be located at the edge of the weight, or it can be completely located at other positions where the weight has no mass distribution.

Figure 4:
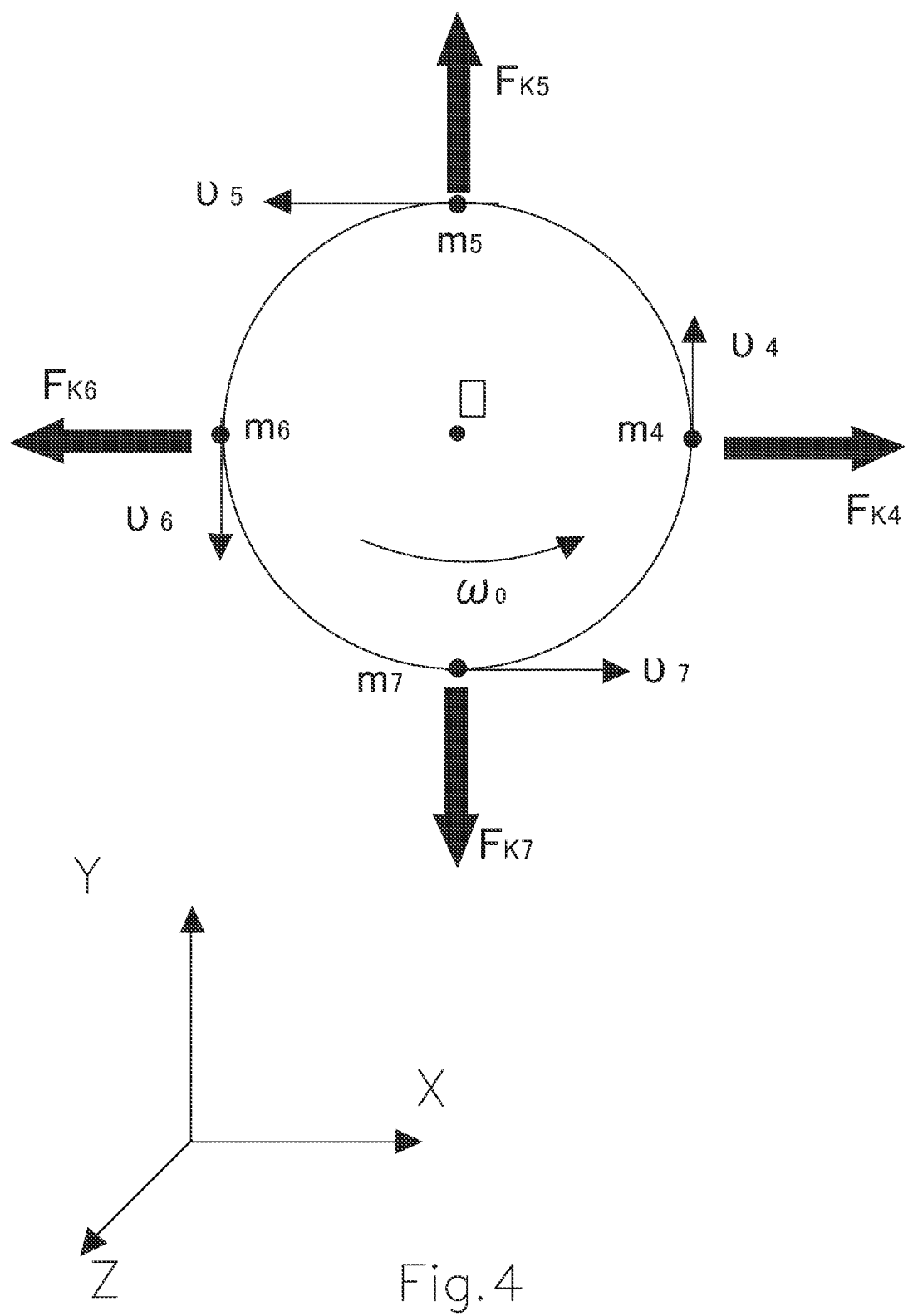
FIG. 4 is a schematic view of another drive mode status of weight in gyroscope.

Although there are always some mass points in the swing weight that can be affected by Coriolis force, there is also such a situation. Please refer to FIG. 4. FIG. 4 is a schematic view of another drive mode status of weight in gyroscope. Wherein, the weight is a circle, and the swing center is located on the circle weight. And the swing center is located at the center of circle of the circular weight. It can be understood that when the circular weight swings around the center of circle 0 at an angular velocity of ω 0 degrees, when measuring the Z axis angular velocity. Although all the mass points on the round weight can be affected by Coriolis force, but the Coriolis force on the weight is symmetrically distributed in the center of circle O, and the resultant force of the Coriolis force on the circular weight is zero. In this case, the measurement of Z axis angular velocity cannot be achieved. Therefore, in order to avoid this situation, in the three-axis micromachined gyroscope provided by the embodiment of this application, the swing center of the weight is located outside the weight to ensure that the Coriolis force on the same weight will not cancel each other out.

When measuring angular velocity, there are often errors caused by orthogonal errors and shock vibrations. This will affect the accuracy of angular velocity measurement. The quadrature error is similar to the concept of "zero point drift". That is, when there is no angular velocity input, the gyroscope can still measure the angular velocity. This is caused by manufacturing and installation errors in the production process. Exemplarily, the movement under the weight drive mode status deviates from the preset trajectory, which results in a position change deviating from the pre-set movement trajectory. The position change will also be detected by the detection part, and the "angular velocity" will be further calculated. Obviously, this measurement result is not an angular velocity measurement result. In addition, when the gyroscope encounters a collision or external vibration, the measuring unit inside the gyroscope will deviate to a certain extent under the action of the impact force. This causes the weight position to change, and this position change can also be detected by the detection part. However, this position change is not caused by Coriolis force, which causes the error of the gyroscope. If there is vibration and shock during the measurement of angular velocity, it will cause measurement errors. Exemplarily, when an angular velocity with acceleration is received, it can be known from Newton's second law that there is a force that provides the angular acceleration. The force that provides acceleration can also cause shock and vibration inside the gyroscope, resulting in errors. In order to avoid quadrature error and vibration shock error, when gyroscope is measuring any axis, generally two weights with anti-phase motion are used to measure an angular velocity at the same time That is, differential detection of angular velocity is performed. Differential detection can effectively avoid measurement errors caused by quadrature errors and various vibrations and shocks. Therefore, the gyroscope is often designed that an even number of symmetrically distributed weights combine with a symmetrical design and inverted drive mode status to realize differential detection and improve detection accuracy.

It should be noted that in order to achieve differential detection and improve the measurement accuracy of the three-axis micromachined gyroscope 100, the shape and size of the four weights are the same. And the four weights are arranged symmetrically in pairs. The weight can have various shapes. Exemplarily, the weight may be a semicircular shape. Of course, the weight can also be a semicircle, a square, or a sector shape whose central angle does not exceed 180 degrees, or it can be a frame structure, such as a square frame, a semicircular frame, or a sector frame, etc. The frame structure can reduce the weight and facilitate the installation of the detection electrode.

It should be noted that when calculating the angular velocity, what should be calculated first is the movement speed of the weight in drive mode status. Therefore, the gyroscope needs to pre-set the electrical parameters provided by drive electrode 8 and the range of motion of the weight to determine the speed of the weight in drive mode status. For the convenience of calculation, the drive mode status of the weight in the three-axis micromachined gyroscope 100 is often designed as a periodic motion, such as periodic reciprocating motion or swing. It is understandable that when the drive mode status is a periodic motion, the Coriolis force of the weight is also periodic, so the Coriolis motion of the weight under the action of Coriolis force is also periodic.

Please continue to refer to FIG. 1. the four weights include a first weight 42a, a second weight 42b, a third weight 42c, and a fourth weight 42d located on the same plane. A first axis X is arranged between the first weight 42a and the third weight 42c. The first weight 42a and the third weight 42c are symmetrical about the first axis X. The second weight 42b and the fourth weight 42d are symmetrical about the first axis X.

A second axis Y is arranged between the first weight 42a and the second weight 42b. The first weight 42a and the second weight 42b are symmetrical about the second axis Y. The third weight 42c and the fourth weight 42d are symmetrical about the second axis Y.

The first axis X is perpendicular to the second axis Y. The three-axis micromachined gyroscope 100 also includes a third axis Z perpendicular to the first axis X and the second axis Y at the same time. The first axis X, the second axis Y, and the third axis Z constitute a spatial rectangular coordinate system. The intersection of the first axis X and the second axis Y is the origin of the spatial rectangular coordinate system. Wherein, the direction from the first weight 42a to the second weight 42b is the positive direction of the first axis X. The direction from the third weight 42c to the first weight 42a is the positive direction of the second axis Y. The direction of weight away from base 2 is the positive direction of third axis Z.

The four weights on the same plane are more conducive to the processing and assembly of the three-axis micromachined gyroscope 100. Alternatively, the four weights may not be on the same plane but are symmetrical. This can also achieve three-axis differential detection, while satisfying that all four weights participate in the Coriolis motion, which improves the sensitivity of the gyroscope.

When the four weights are in drive mode status. The swing of one weight is in phase with the swing of the other weight and in anti-phase with the swing of the other two weights, which can realize differential detection for any angular velocity.

Figure 5:
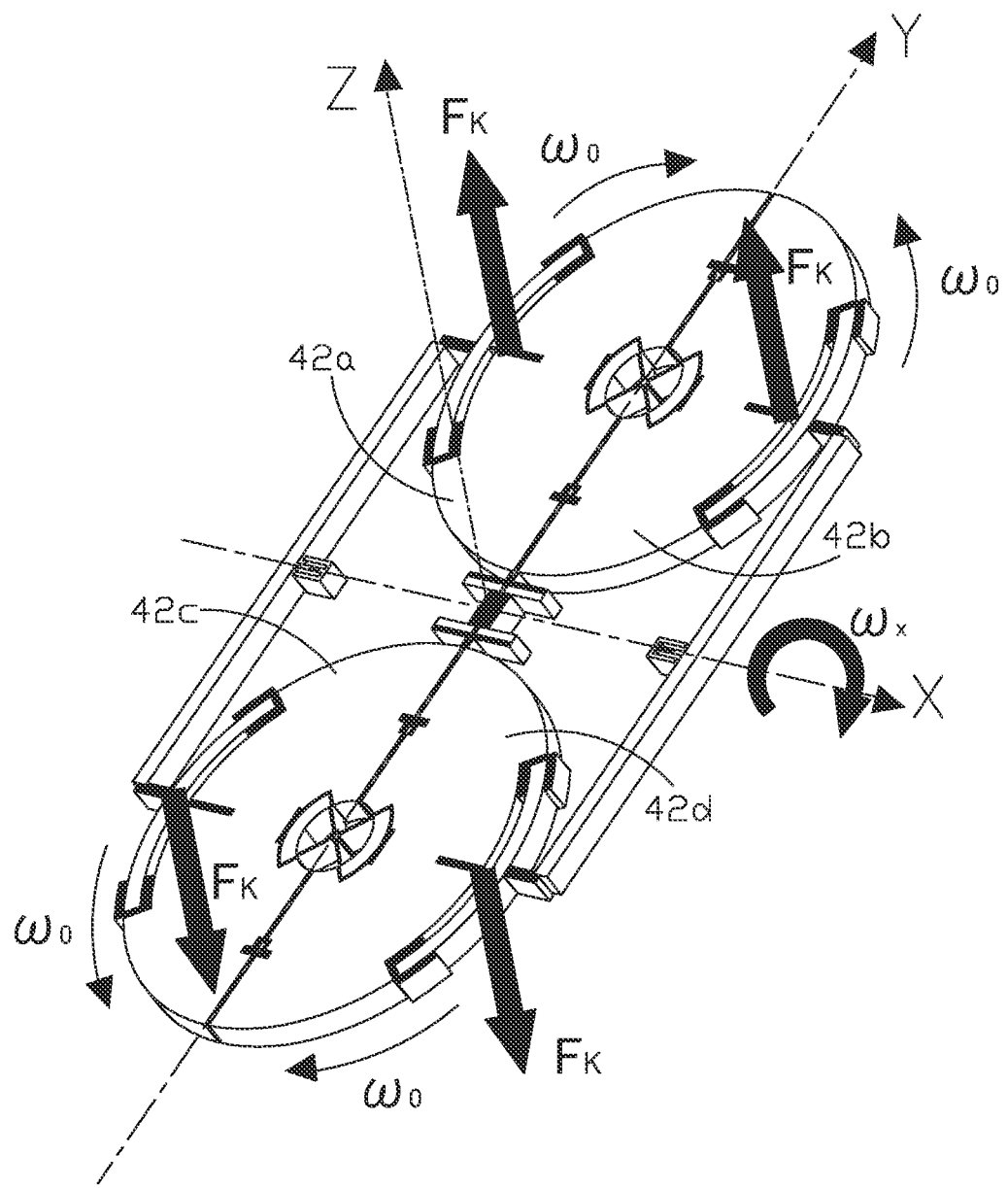
FIG. 5 is a schematic view of the Coriolis force received by the four weights when the angular velocity in the first axis direction is detected under the first drive mode status.
Figure 6:
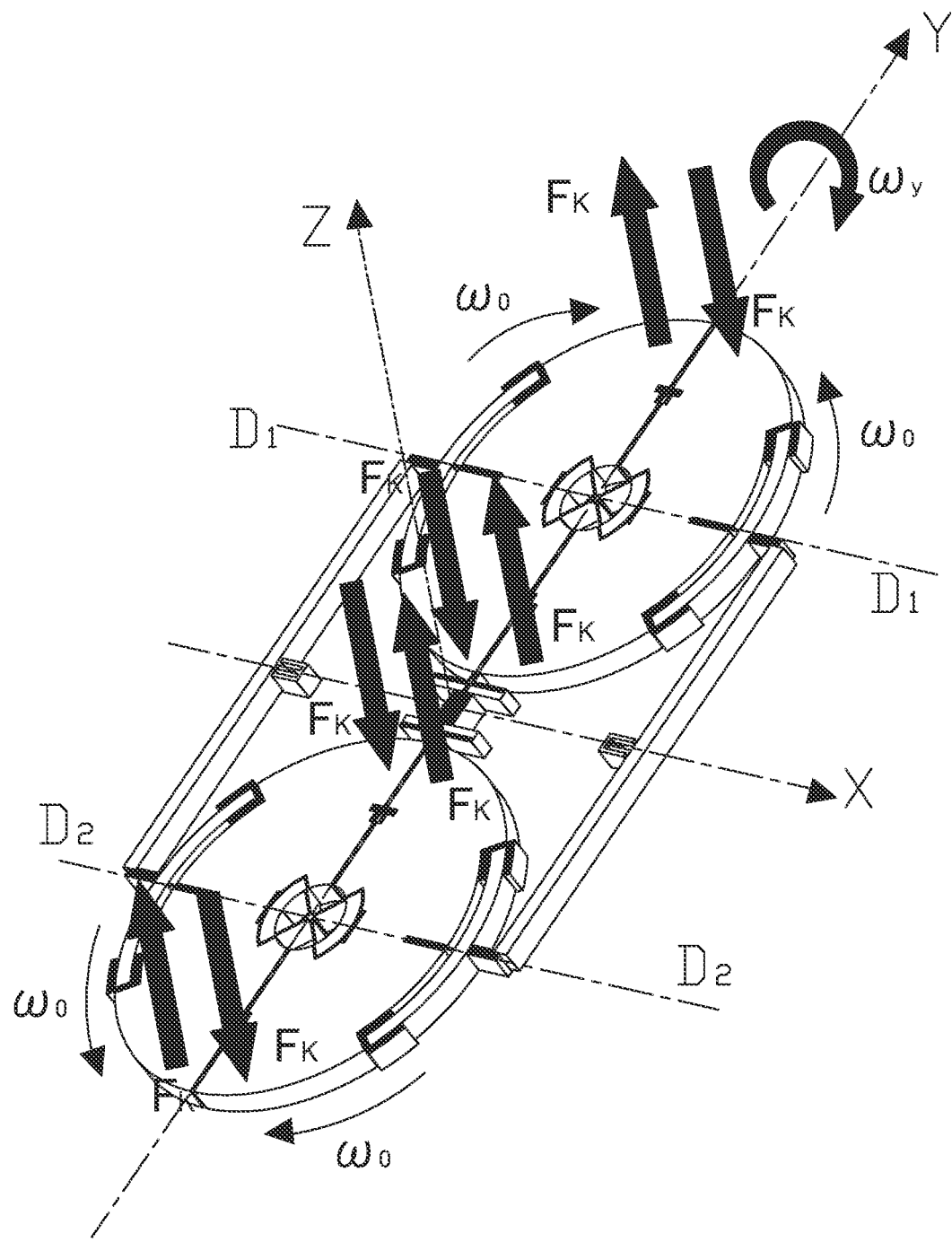
FIG. 6 is a schematic view of the Coriolis force received by the four weights when the angular velocity in the second axis direction is detected under the first drive mode status.
Figure 7:
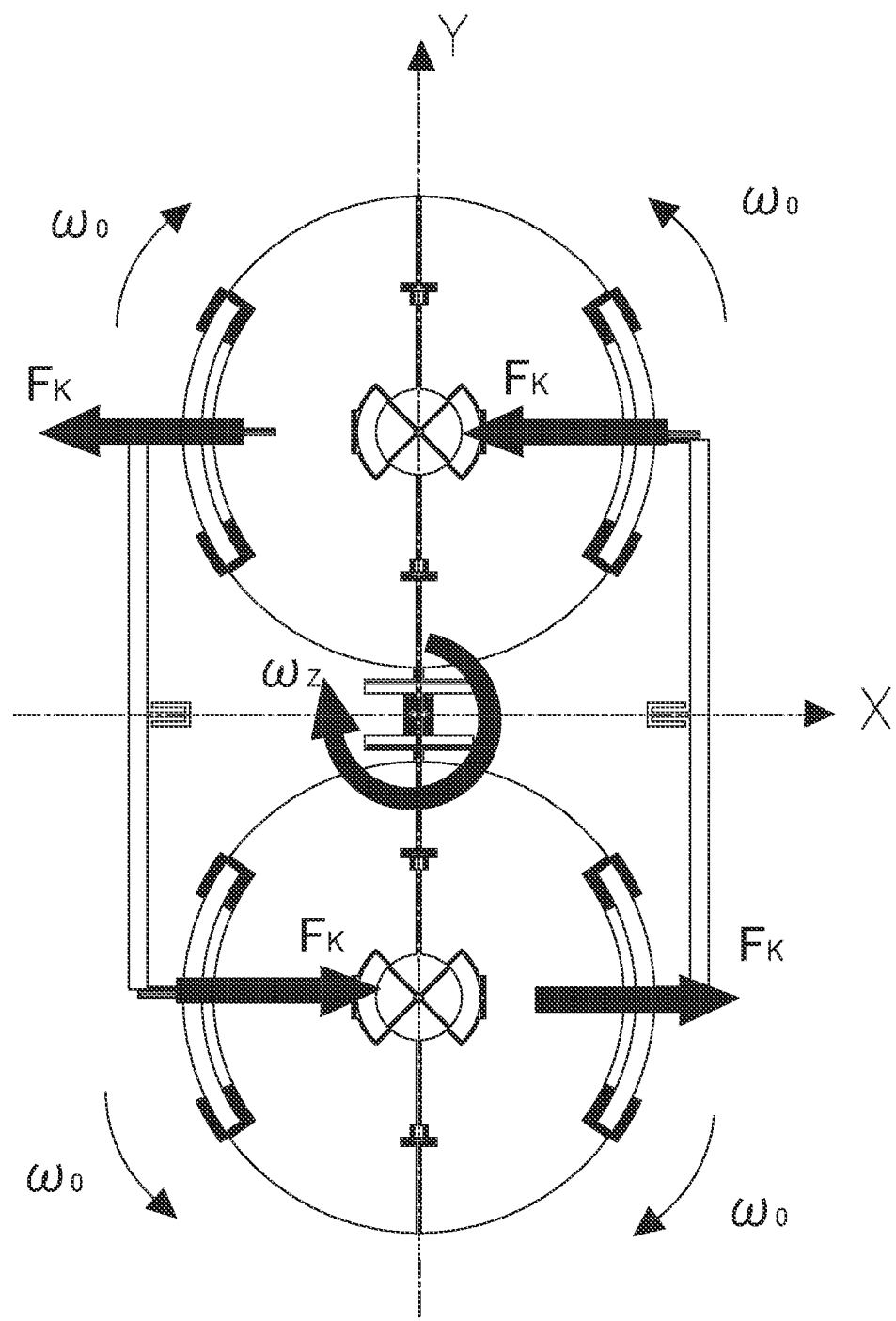
FIG. 7 is a schematic view of the Coriolis force received by the four weights when the angular velocity in the third axis direction is detected under the first drive mode status.

In one embodiment, please refer to FIGS. 5 to 7 in combination. FIG. 5 is a schematic view of the Coriolis force received by the four weights when the angular velocity in the first axis X direction is detected under the first drive mode status. FIG. 6 is a schematic view of the Coriolis force received by the four weights when the angular velocity in the second axis Y direction is detected under the first drive mode status. FIG. 7 is a schematic view of the Coriolis force received by the four weights when the angular velocity in the third axis Z direction is detected under the first drive mode status. Specifically, the drive electrode 8 drives the first weight 42a and the second weight 42b to swing in anti-phase. The drive electrode 8 drives the third weight 42c and the fourth weight 42d to swing in anti-phase. Wherein, the swing of the first weight 42a and the swing of the third weight 42c are in anti-phase.

When the three-axis micromachined gyroscope 100 receives the angular velocity in the first axis X direction, the four weights all rotate around the second axis Y. The overturn of the first weight 42a and the overturn of the second weight 42b are in same phase. The overturn of the third weight 42c and the overturn of the fourth weight 42d are in same phase. The overturn of the first weight 42a and the overturn of the third weight 42c are in anti-phase. For details, please refer to FIG. 5. Exemplarily, at a certain moment, the first weight 42a and the fourth weight 42d swing clockwise at the angular velocity ω0. The second weight 42b and the third weight 42c swing counterclockwise at the angular velocity ω0. When the angular velocity ωx in the first axis X direction is input to the three-axis micromachined gyroscope 100, as described in the right-hand rule, the resultant force FK of the Coriolis force on the first weight 42a is along the positive direction of the third axis Z. the direction of the resultant force FK of the Coriolis force on the second weight 42b is along the positive direction of the third axis Z, and the first weight 42a and the second weight 42b are reversed around the second axis Y to the positive direction of the third axis Z. The direction of the resultant force FK of the Coriolis force of the third weight 42c is along the negative direction of the third axis Z. The direction of the resultant force FK of the Coriolis force of the fourth weight 42d is along the negative direction of the third axis Z. The third weight 42c and the fourth weight 42d overturn around the second axis Y to the negative direction of the third axis Z. Therefore, the entirety of the first weight 42a and the second weight 42b and the entirety of the third weight 42c and the fourth weight 42d form an anti-phase Coriolis motion. The differential detection of angular velocity of first axis X can be realized. It is understandable that when the swing direction of the weight changes at other times, the direction of Coriolis force also changes with the change of the swing direction of the weight.

When the three-axis micromachined gyroscope 100 receives the angular velocity in the second axis Y direction, the four weights all perform overturning movements around their respective flip axis D. The flip axis D passes through the swing center of the weight and is parallel to the first axis X. The overturn of the first weight 42a and the overturn of the second weight 42b are reversed. The overturn of the third weight 42c is inverse to the overturn of the fourth weight 42d. The overturn of the first weight 42a and the overturn of the third weight 42c are in anti-phase. Please refer to FIG. 6, for example, at a certain moment, the first weight 42a and fourth weight 42d swing clockwise at angular velocity ω0, and the second weight 42b and third weight 42c swing counterclockwise at angular velocity ω0. When the angular velocity along the second axis Y direction ωy is input to the three-axis micromachined gyroscope 100, the Coriolis force FK received by the half of the first weight 42a close to the first axis X is along the negative direction of the third axis Z. The Coriolis force FK received by the half of the first weight 42a away from the first axis X is along the positive direction of the third axis Z. Then the first weight 42a is overturned around the first flip axis D1. Correspondingly, the second weight 42b is overturned around the first flip axis D1 under the action of Coriolis force. The Coriolis motions of the first weight 42a and the second weight 42b are reversed. It can realize the differential detection of the second axis Y. The third weight 42c and fourth weight 42d are overturned around the second flip axis D2 under the action of Coriolis force. The Coriolis motion of the third weight 42c and the fourth weight 42d is reversed. The third weight 42c and fourth weight 42d can also realize the differential detection of the angular velocity of the second axis Y. Wherein, the Coriolis motion of the first weight 42a and the third weight 42c are in anti-phase.

When the three-axis micromachined gyroscope 100 receives the angular velocity ω z in the third axis Z direction, the four weights all move along the first axis X direction. The movement of the first weight 42a and the movement of the second weight 42b are in same phase. The movement of the third weight 42c and the movement of the fourth weight 42d are in same phase. The movement of the first weight 42a and the movement of the third weight 42c are in anti-phase. Specifically, please refer to FIG. 7. At a certain moment, the first weight 42a and the fourth weight 42d swing clockwise at angular velocity 0. The second weight 42b and the third weight 42c swing counterclockwise at the angular velocity ω0. When the angular velocity of ωz along the third axis Z direction is input to the three-axis micromachined gyroscope 100, the first weight 42a and the second weight 42b receive Coriolis force FK in the negative direction of the first axis X, and move in the negative direction of the first axis X. The third weight 42c and the fourth weight 42d receive Coriolis force FK in the negative direction of the first axis X and move in the positive direction of the first axis X. Therefore, the whole of the first weight 42a and the second weight 42b and the whole of the third weight 42c and the fourth weight 42d complete the differential detection of the angular velocity of third axis Z.

It is understandable that when the angular velocity in any direction is input, the angular velocity can be decomposed along the first axis X, the second axis Y, and the third axis Z. The weight will be subjected to the Coriolis force in multiple directions and perform complex Coriolis motion under the action of Coriolis force. Detection part 6 can separately measure the sub-speeds along the three axes, and then synthesize the speeds, and finally obtain the size and direction of the speed.

Figure 8:
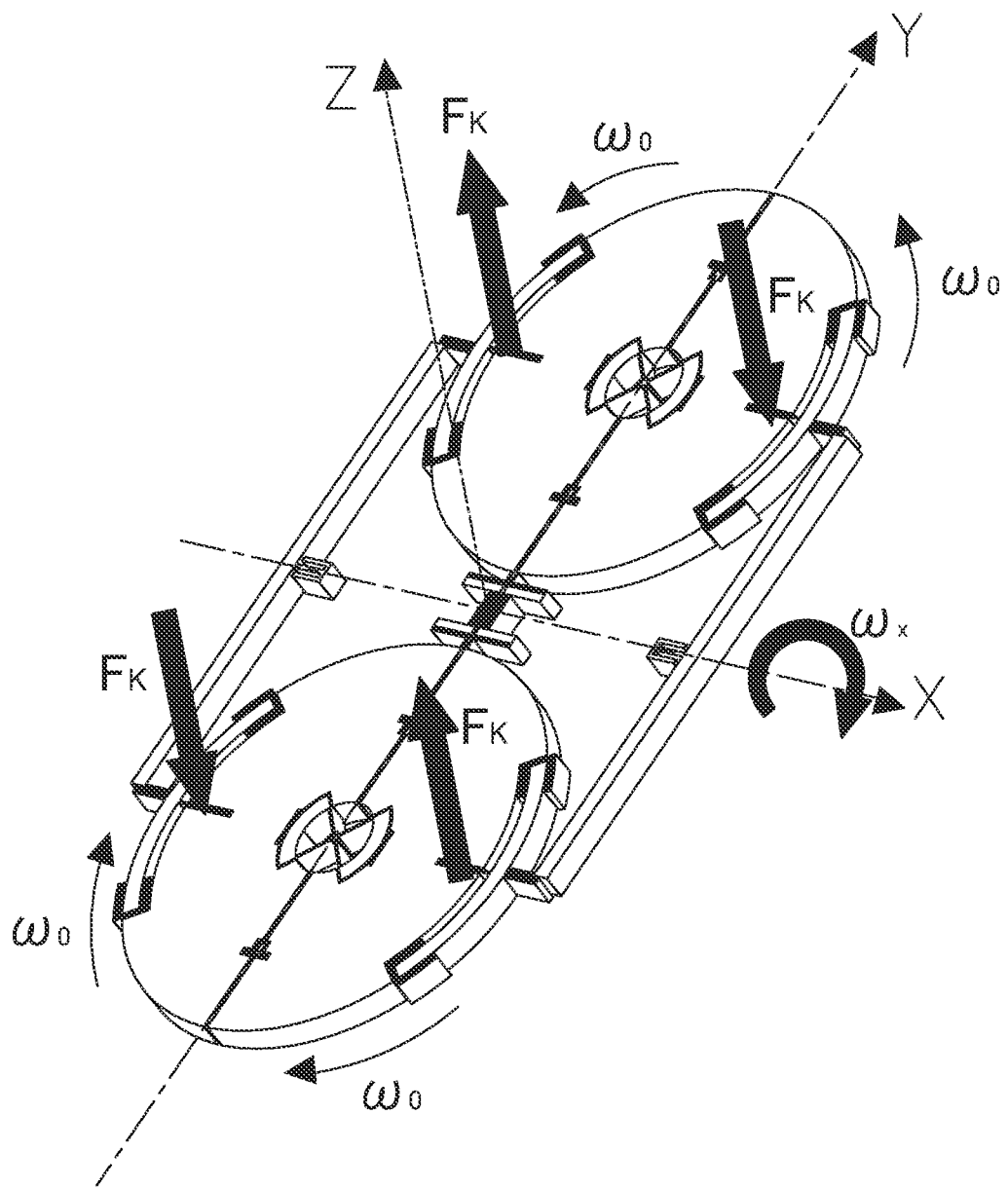
FIG. 8 is a schematic view of the Coriolis force received by the four weights when the angular velocity in the first axis direction is detected under the second drive mode status.
Figure 9:
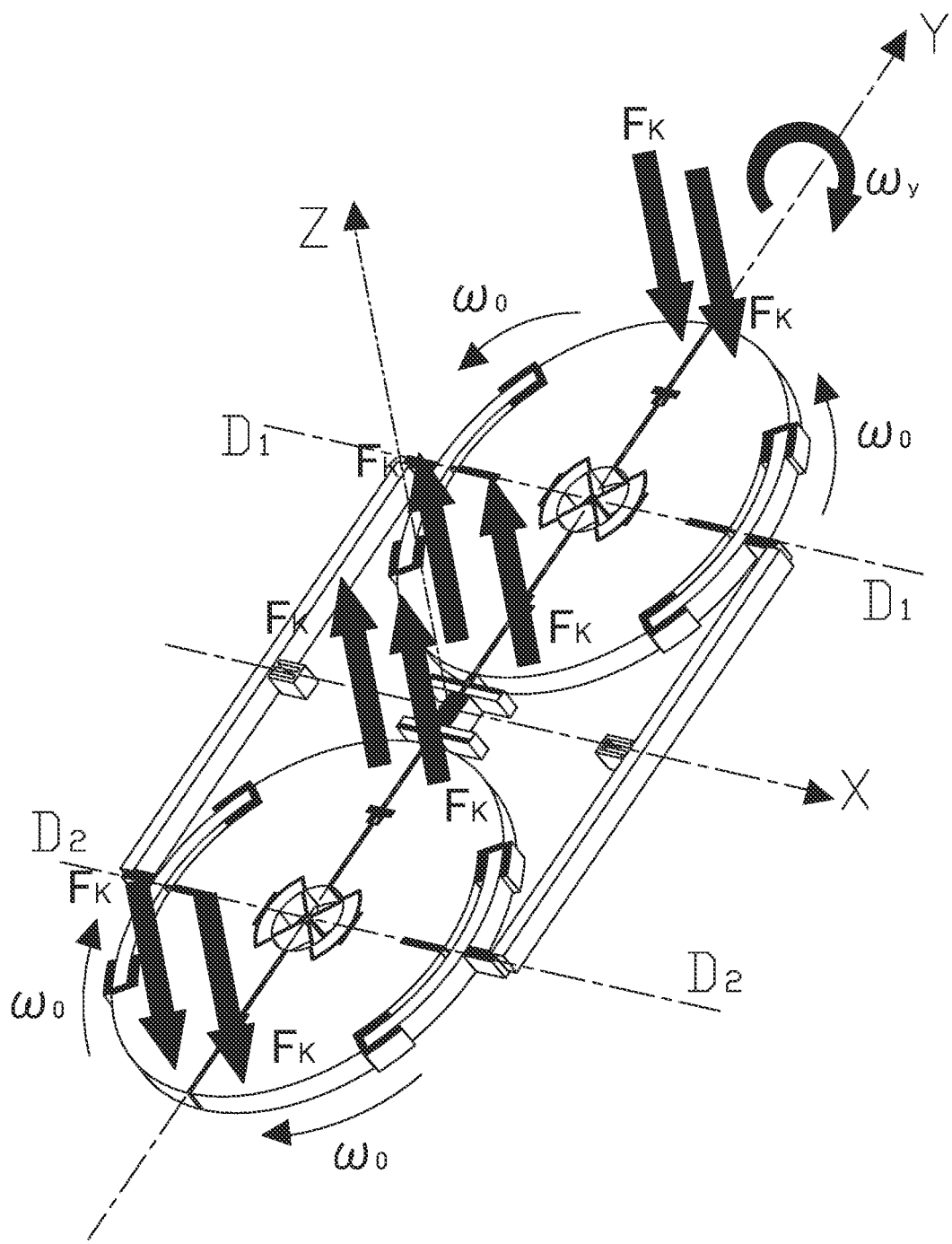
FIG. 9 is a schematic view of the Coriolis force received by the four weights when the angular velocity in the second axis direction is detected under the second drive mode status.
Figure 10:
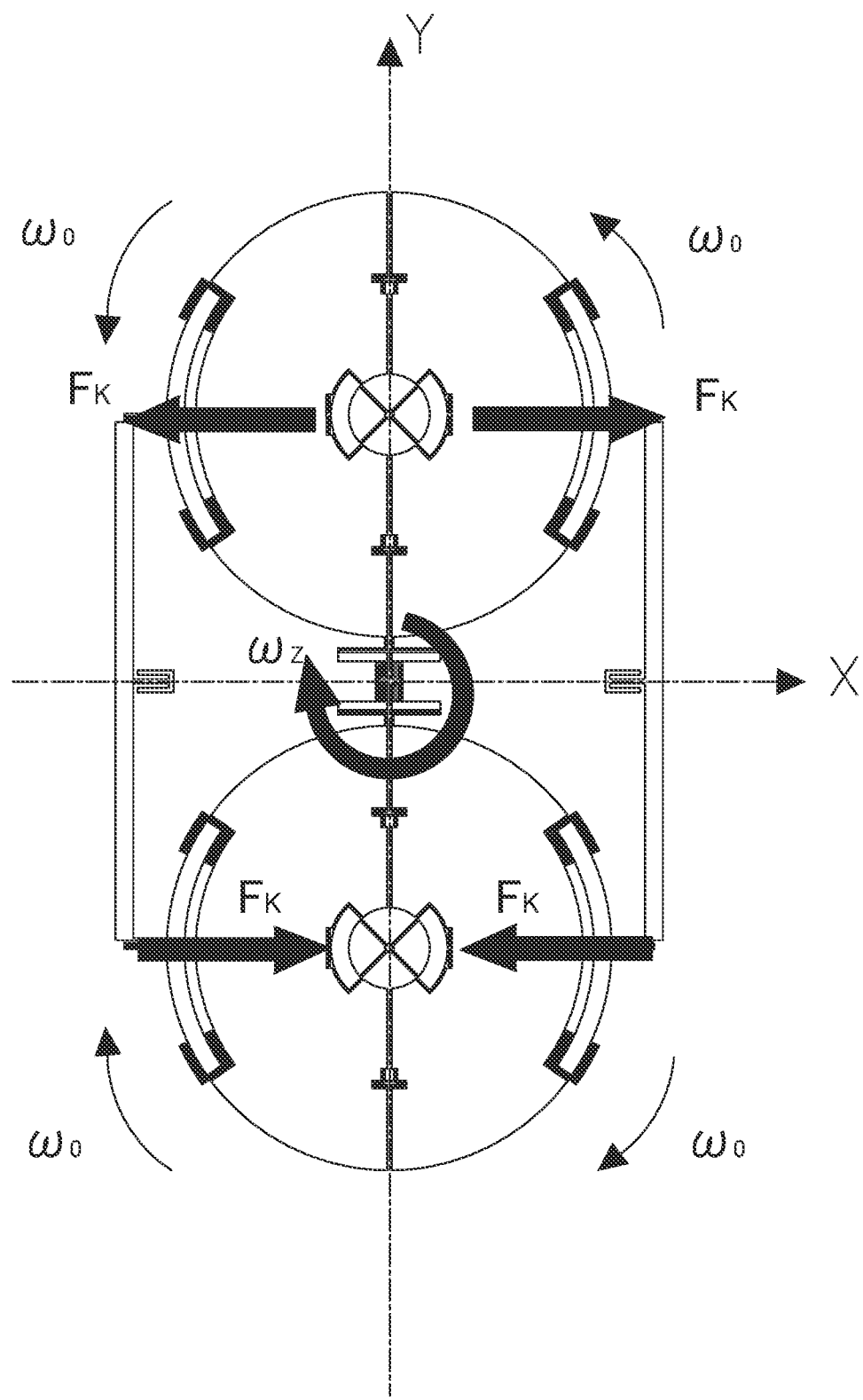
FIG. 10 is a schematic view of the Coriolis force received by the four weights when the angular velocity in the third axis direction is detected under the second drive mode status.

Alternatively, please refer to FIGS. 8 to 10 in combination. FIG. 8 is a schematic view of the Coriolis force received by the four weights when the angular velocity in the first axis X direction is detected under the second drive mode status. FIG. 9 is a schematic view of the Coriolis force received by the four weights when the angular velocity in the second axis Y direction is detected under the second drive mode status. FIG. 10 is a schematic view of the Coriolis force received by the four weights when the angular velocity in the third axis Z direction is detected under the second drive mode status. The drive electrode 8 drives the first weight 42a and the second weight 42b to swing in same phase. The drive electrode 8 drives the third weight 42c and the fourth weight 42d to swing in same phase. Wherein, the swing of the first weight 42a and the swing of the third weight 42c are in anti-phase.

When the three-axis micromachined gyroscope 100 receives the angular velocity ωx in the first axis X direction, the four weights all overturn around the second axis Y. The overturn of the first weight 42a and the overturn of the second weight 42b are reversed. The overturn of the third weight 42c is inverse to the overturn of the fourth weight 42d. The overturn of the first weight 42a and the overturn of the third weight 42c are in anti-phase. Specifically, please refer to FIG. 8. At a certain moment, the first weight 42a and the second weight 42b swing counterclockwise at angular velocity ω0. The third weight 42c and the fourth weight 42d swing clockwise at angular velocity ω 0. When the angular velocity ω x in the first axis X direction is input to the three-axis micromachined gyroscope 100, the Coriolis force FK of the first weight 42a is in the positive direction of the third axis Z. The first weight 42a is overturned around the second axis Y in the positive direction of the third axis Z. The direction of Coriolis force FK received by the second weight 42b is along the negative direction of the third axis Z. The second weight 42b is overturned around the second axis Y to the negative direction of the third axis Z. The Coriolis force received by the third weight 42c is in the negative direction of the third axis Z, and the third weight 42c is overturned around the second axis Y to the negative direction of the third axis Z. The fourth weight 42d Coriolis force is along the positive direction of the third axis Z. The fourth weight 42d is overturned around the second axis Y to the positive direction of the third axis Z. Therefore, the differential detection of the angular velocity in the first axis X direction can be realized between the first weight 42a and the second weight 42b. Differential detection can also be completed between the third weight 42c and the fourth weight 42d.

When the three-axis micromachined gyroscope 100 receives the angular velocity ωy in the Y direction of the second axis, the four weights all perform an overturning movement around the flip axis. The overturn of the first weight 42a and the overturn of the second weight 42b are in same phase. The overturn of the third weight 42c and the overturn of the fourth weight 42d are in same phase. The overturn of the first weight 42a and the overturn of the third weight 42c are in anti-phase. Specifically, please refer to FIG. 9. At a certain moment, the first weight 42a and the second weight 42b swing counterclockwise with angular velocity ω0. The third weight 42c and the fourth weight 42d swing clockwise at angular velocity ω 0. When the angular velocity along the second axis Y direction ωy is input to the three-axis micromachined gyroscope 100, the Coriolis force received by the half of the first weight 42a close to the first axis X is along the positive direction of the third axis Z. The Coriolis force of the half of the first weight 42a away from the first axis X is along the negative direction of the third axis Z. Then the first weight 42a is overturned around the first flip axis D1. Correspondingly, the second weight 42b is overturned around the first flip axis D1 under the action of Coriolis force. The Coriolis motions of the first weight 42a and the second weight 42b are in phase. The third weight 42c and fourth weight 42d are overturned in same phase around the second flip axis D2 under the action of Coriolis force. Wherein, the Coriolis motion of the first weight 42a and the third weight 42c are in anti-phase. The whole of the first weight 42a and the second weight 42b and the whole of the third weight 42c and the fourth weight 42d realize the differential detection of the second axis Y angular velocity.

When the three-axis micromachined gyroscope 100 receives the angular velocity in the third axis Z direction, the four weights all move along the first axis X direction. The movement of the first weight 42a and the movement of the second weight 42b are in anti-phase. The movement of the third weight 42c and the movement of the fourth weight 42d are in anti-phase. The movement of the first weight 42a and the movement of the third weight 42c are in anti-phase. Specifically, please refer to FIG. 10, at a certain moment, the first weight 42a and the second weight 42b swing counterclockwise with angular velocity ω0. The third weight 42c and the fourth weight 42d swing clockwise at angular velocity ω 0. When the angular velocity along the third axis Z direction ωz is input to the three-axis micromachined gyroscope 100, the first weight 42a receives Coriolis force along the negative direction of the first axis X, thereby moving in the negative direction of the first axis X. The second weight 42b receives Coriolis force in the positive direction of the first axis X, and thus moves in the positive direction of the second axis Y. The first weight 42a and the second weight 42b can realize the differential detection of the angular velocity of third axis Z. In the same way, the Coriolis force direction of the third weight 42c and the fourth weight 42d are in anti-phase, and the Coriolis force direction of the first weight 42a and the third weight 42c are in anti-phase.

Figure 11:
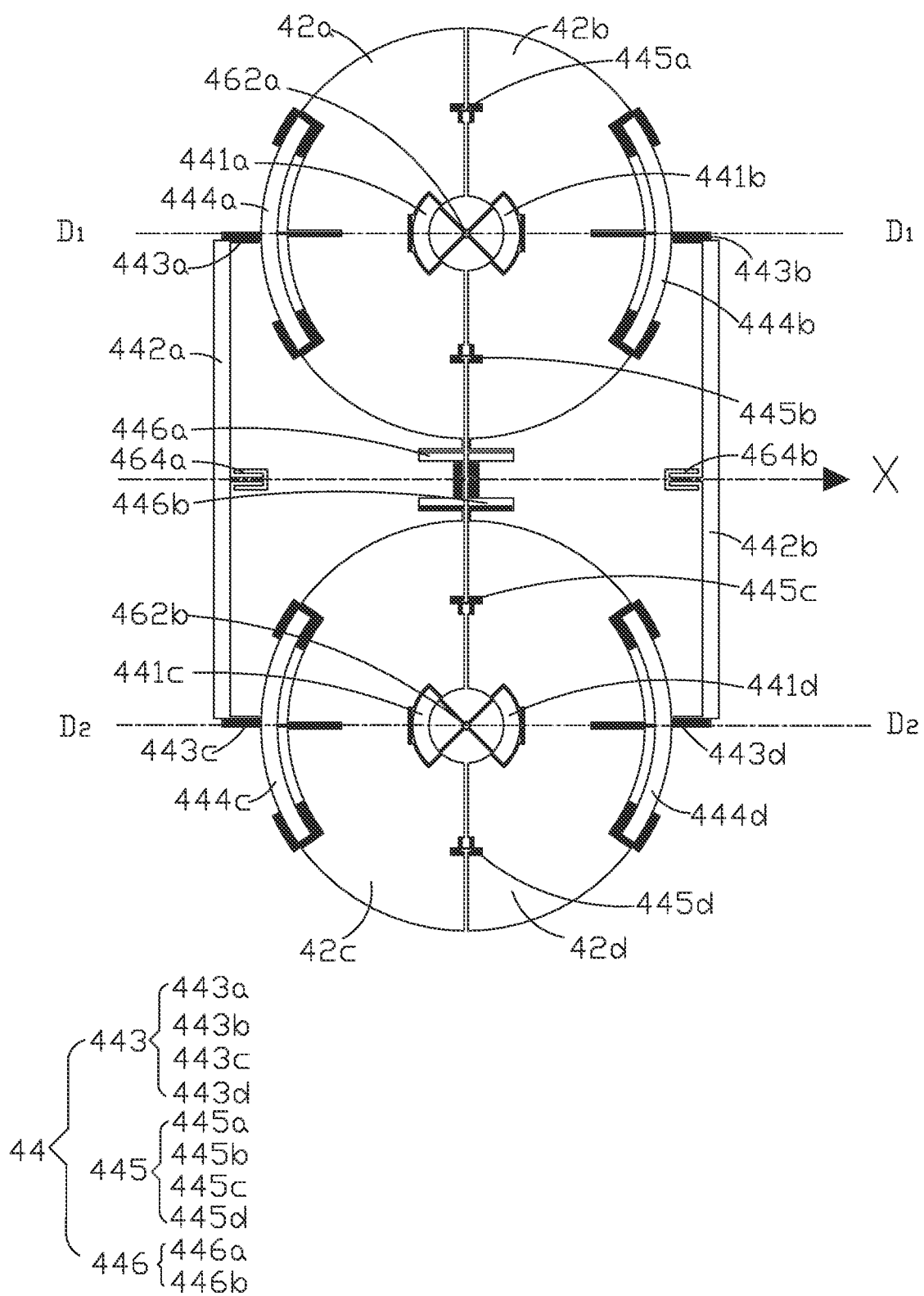
FIG. 11 is a schematic view of the second structure of the three-axis micromachined gyroscope provided by the present invention.

Please refer to FIG. 11. FIG. 11 is a schematic view of the second structure of the three-axis micromachined gyroscope provided by the present invention. The vibration part 4 also includes a connection assembly 44 and a fixing assembly 46. Wherein, the fixing assembly 46 is used to connect the four weights to the base 2, and the connection assembly 44 is used to connect the weights. Connect the four weights into a complete whole. The use of connection assembly 44 can facilitate the fixation and restraint of weight. In this way, the four weights are located in the same plane. At the same time, the setting of connection assembly 44 also delineates the detection range of gyroscope.

The fixing assembly 46 includes two anchors 462 for connecting the four weights with the base 2. The two anchors 462 include a first anchor 462a and a second anchor 462b arranged along the second axis Y and symmetrically distributed with respect to the first axis X. The first weight 42a and the second weight 42b are both connected to the base 2 through the first anchor 462a. The third weight 42c and the fourth weight 42d are both connected to the base 2 through the second anchor 462b. The first weight 42a and the second mass both swing concentrically with the first anchor 462a as the swing center. The third weight 42c and the fourth weight 42d both swing concentrically with the second anchor 462b as the swing center. It can be understood that the first anchor 462a is the swing center shared by the first weight 42a and the second weight 42b. The second anchor 462b is the swing center shared by the third weight 42c and the fourth weight 42d. The sharing of the swing center can make the structure more compact and reduce the volume of the gyroscope. The swing centers of each weight can also be set without overlapping. It should be noted that there is a certain gap between the first weight 42a and the second weight 42b so that the weight can swing periodically under the drive mode status, or perform Coriolis motion under the detection mode. But whether it is drive mode status or detection mode, the motion amplitude of weight is controlled in a relatively small range. Therefore, there is no need to leave too much movement space between the weights, which is beneficial to the reduction of the volume of the gyroscope and the energy consumption of the gyroscope.

It can be understood that the flip axis of the first weight 42a and the flip axis of the second weight 42b overlap, which is the first flip axis D1. The first flip axis passes through the first anchor 462a and is parallel to the first axis X. The flip axis of the third weight 42c coincides with the flip axis of the fourth weight 42d, which is the second flip axis D2. The second flip axis D2 passes through the second anchor 462b and is parallel to the first axis X.

Please continue to refer to FIG. 11. The connection assembly 44 includes an inner coupling member 441 that connects each weight to the anchor 462 corresponding to it. The inner coupling member 441 is located between weight and anchor 462. It is understandable that if the weight is directly connected to the anchor 462, the Coriolis motion of the weight will be restricted, which is not conducive to the change of the weight position. As a result, the output of electrical signals is reduced, which is not conducive to maximizing the sensitivity. The inner coupling member 441 provides radial and axial degrees of freedom to the weight. Not only can the weight be connected to base 2 through the anchor 462, but also the anchor 462 will not affect the weight's Coriolis motion too much. The connection assembly 44 includes a first inner coupling member 441a connected to the first weight 42a, a second inner coupling member 441b connected to the second weight 42b, and a third inner coupling member 441c connected to the third weight 42c, and the fourth inner coupling member 441d connected with the fourth weight 42d. Wherein, the first inner coupling member 441a and the second inner coupling member 441b are connected and fixed with the first anchor 462a. The third inner coupling member 441c and the fourth inner coupling member 441d are connected and fixed to the second anchor 462b.

Figure 12:
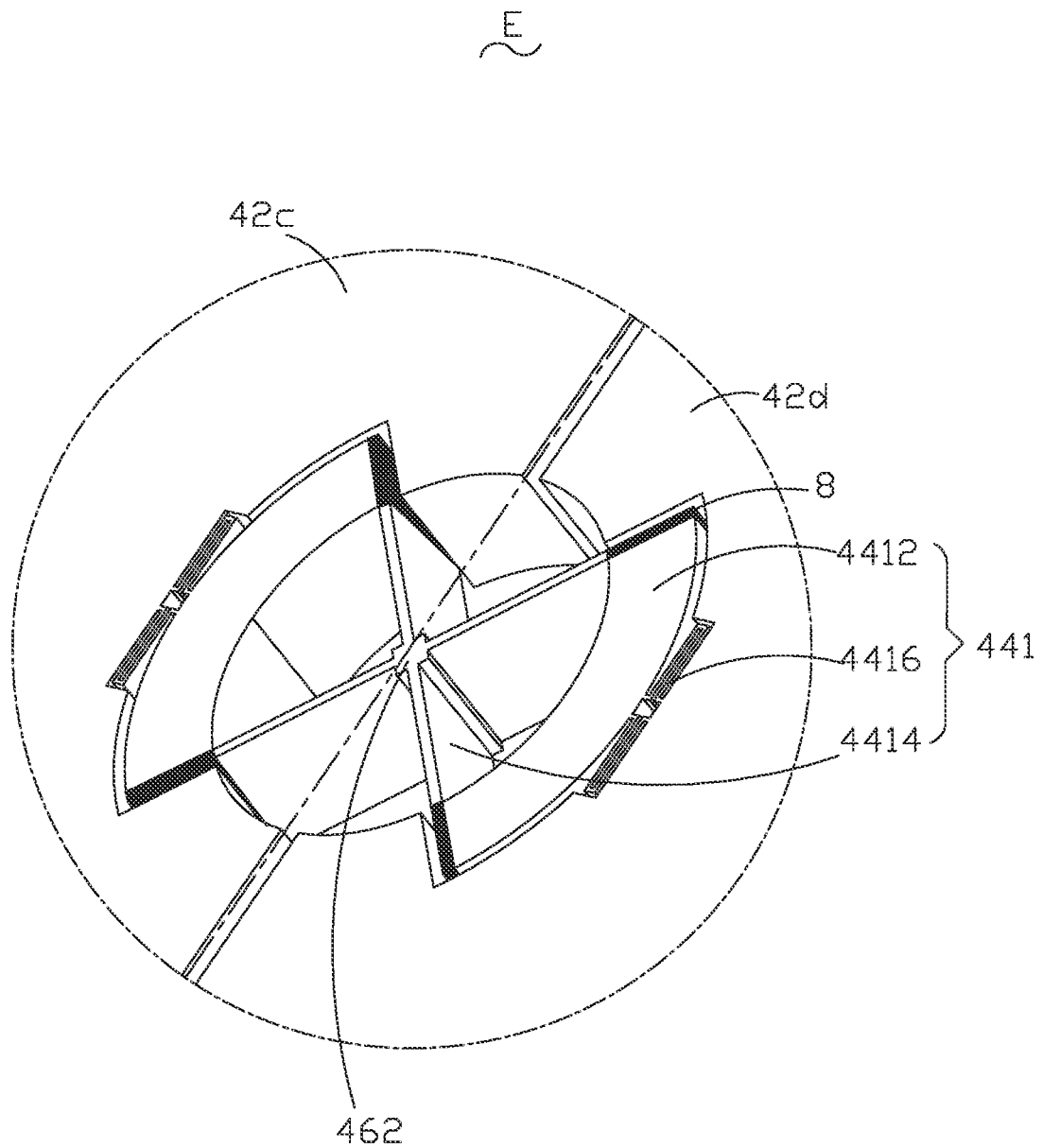
FIG. 12 is a partial enlarged view of part E shown in FIG. 1.

Please refer to FIG. 12 in combination, which is a partial enlarged view of E shown in FIG. 1. The inner coupling member 441 includes a first decoupling structure 4412, a fourth connection beam 4414 that connects the anchor 462 and the first decoupling structure 4412, and a fifth connection beam 4416 connecting first decoupling structure 4412 and weight. The fourth connection beam 4414 is directly connected to the anchor 462. The fourth connection beam 4414 and first decoupling structure 4412 are fixed to base 2 through anchor 462.

The fourth connection beam 4414 has a large degree of freedom in the circumferential direction. At the same time, the fifth connection beam 4416 has a bending structure, and has a large degree of circumferential stiffness and radial and out-of-plane freedom. Therefore, when the drive electrode 8 drives the weight to swing, the fourth connection beam 4414 and the first decoupling structure 4412 swing around the anchor 462. The first decoupling structure 4412 drives the weight to swing around the anchor 462 through the fifth connection beam 4416. When the three-axis micromachined gyroscope 100 receives the angular velocity in the first axis X direction and the second axis Y direction, the fifth connection beam 4416 deforms along the Z direction of the third axis, the fourth connection beam 4414 and the first decoupling structure 4412 do not move with the weight under the action of Coriolis force. When the three-axis micromachined gyroscope 100 receives the angular velocity in the third axis Z direction, the fifth connection beam 4416 is deformed along the first axis X direction. the fourth connection beam 4414 and the first decoupling structure 4412 do not move with the weight under the action of Coriolis force.

It is understandable that since the first decoupling structure 4412 does not move with the weight under the action of Coriolis force, the drive electrode can be set in the first decoupling structure 4412 to obtain a stable driving effect.

Please continue to refer to FIG. 11. The connection assembly 44 also includes a first connection rod 442a and a second connection rod 442b that are symmetrically distributed about the second axis Y. The first connection rod 442a is arranged on a side of the first weight 42a and the third weight 42c away from the two anchors 462. The first connection rod 442a is used to connect the first weight 42a and the third weight 42c, so that the first weight 42a and the third weight 42c move in anti-phase. The fixing assembly 46 also includes a first support point 464a located at the midpoint of the first connection rod 442a. The first support point 464a is used to connect the first connection rod 442a and the base 2. The first weight 42a, the third weight 42c, and the first connection rod 442a together form an equal arm lever. When measuring the angular velocity of third axis Z with the first weight 42a and second weight 42b, the equal arm lever ensures the anti-phase movement of the first weight 42a and the third weight 42c. Then complete the differential detection of the third axis Z to ensure the detection accuracy.

The second connection rod 442b is arranged on a side of the second weight 42b and the fourth weight 42d away from the two anchors 462. The second connection rod 442b is used to connect the second weight 42b and the fourth weight 42d. In this way, the second weight 42b and the fourth weight 42d move in anti-phase. The fixing assembly 46 also includes a second support point 464b located at the midpoint of the second connection rod 442b. The second support point 464b is used to connect the second connection rod 442b, and together with the base 2, the second weight 42b, the fourth weight 42d, and the first connection rod 442b form an equal-arm lever to ensure detection accuracy Please continue to refer to FIG. 11, the connection assembly 44 also includes four first connection beams 443 and four outer coupling members 444 for connecting the connection rod 442 and the weight. Each outer coupling member 444 is connected to one of the first connection beams 443. Each connection rod 442 is connected to two first connection beams 443. Each of the weights is connected to one of the first connection beams 443. The first connection beam 443 is located on the flip axis D of each weight. One end of the first connection beam 443 is fixed to the first connection rod 442a, and the other end of the first connection beam 443 is fixed to the weight. The first connection rod 442a is connected to the first weight 42a through the first connection beam 443. The first connection rod 442a is connected to the third weight 42c through the first connection beam 443. The second connection rod 442b is connected to the second weight 42b through the first connection beam 443. The second connection rod 442b is connected to the fourth weight 42d through the first connection beam 443. The first outer coupling member 444a is adjacent to the first weight 42a. The second outer coupling member 444b is adjacent to the second weight 42b. The third outer coupling member 444c is adjacent to the third weight 42c. The fourth outer coupling member 444d is adjacent to the fourth weight 42d.

Figure 13:
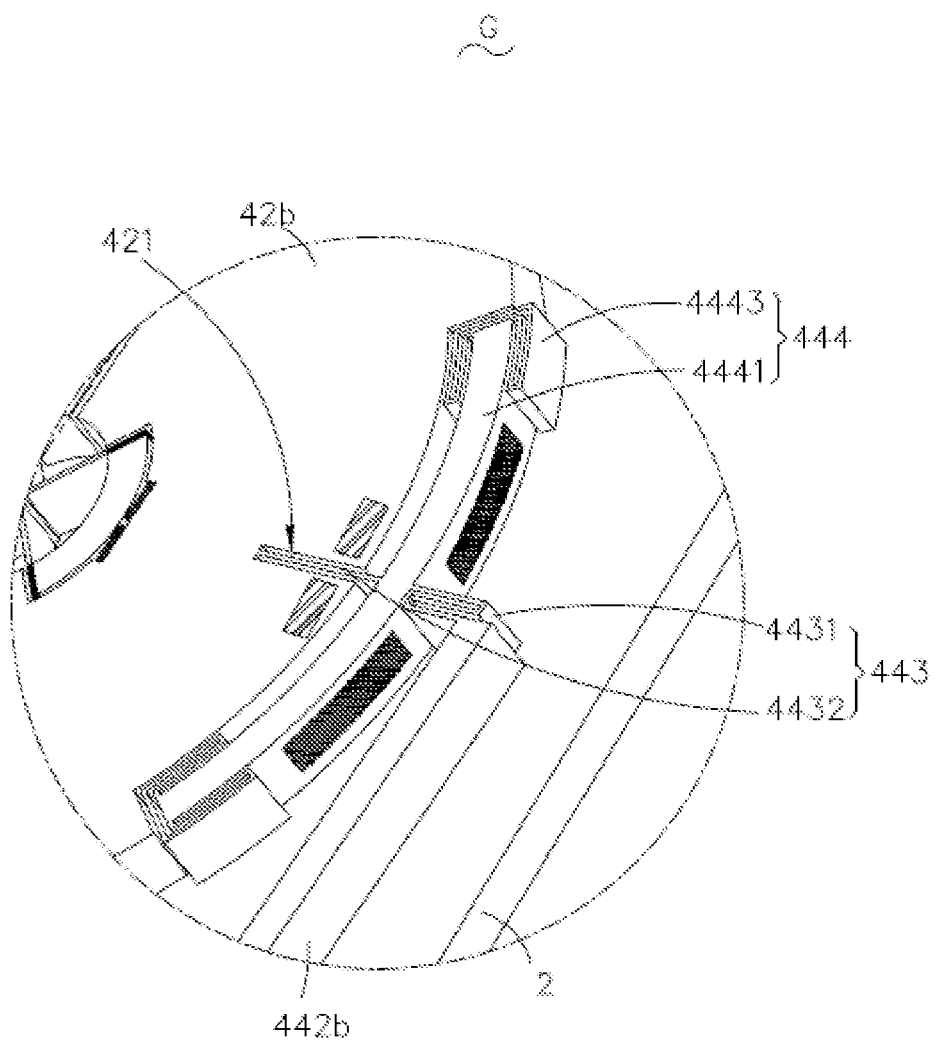
FIG. 13 is a partial enlarged view of part G shown in FIG. 1.

Please refer to FIG. 13 in combination, which is a partial enlarged view of G shown in FIG. 1. The first connection beam 443 includes a fixed part 4431 connected to the connection rod 442, and an extension part 4433 separated from the fixed part 4431 and connected with the weight. A connection slot 421 is arranged on the weight to accommodate part of the first connection beam 443. The extension part 4433 goes deep into the connection slot 421, and its end is connected to the bottom of the connection slot 421. Each outer coupling member 444 includes a second decoupling structure 4441 connected between the fixed part 4431 and the extension part 4433, and a sixth connection beam 4443 arranged between the second decoupling structure 4441 and the base.

The sixth connection beam 4443 has a bending structure, and the sixth connection beam 4443 has greater circumferential rigidity and radial freedom. The first connection beam 443 has larger circumferential direction, out-of-plane freedom and larger radial rigidity. Therefore, when the drive electrode 8 drives the weight to swing, the second decoupling structure 4441, the fixed part 4431, and the connection rod 442 do not swing with the weight. When the three-axis micromachined gyroscope 100 receives the angular velocity in the first axis X direction and the second axis Y direction, the second decoupling structure 4441, the fixed part 4431, and the connection rod 442 do not move under the action of Coriolis force with the weight. When the three-axis micromachined gyroscope 100 receives the angular velocity in the third axis Z direction, the second decoupling structure 4441, the fixed part 4431, and the connection rod 442 move along the first axis X direction.

It is understandable that since the second coupling structure 4441 only moves along the first axis X direction with the weight, the detection electrode used to detect the angular velocity of third axis Z can be set in the second coupling structure 4441 to obtain a stable detection effect.

Figure 14:
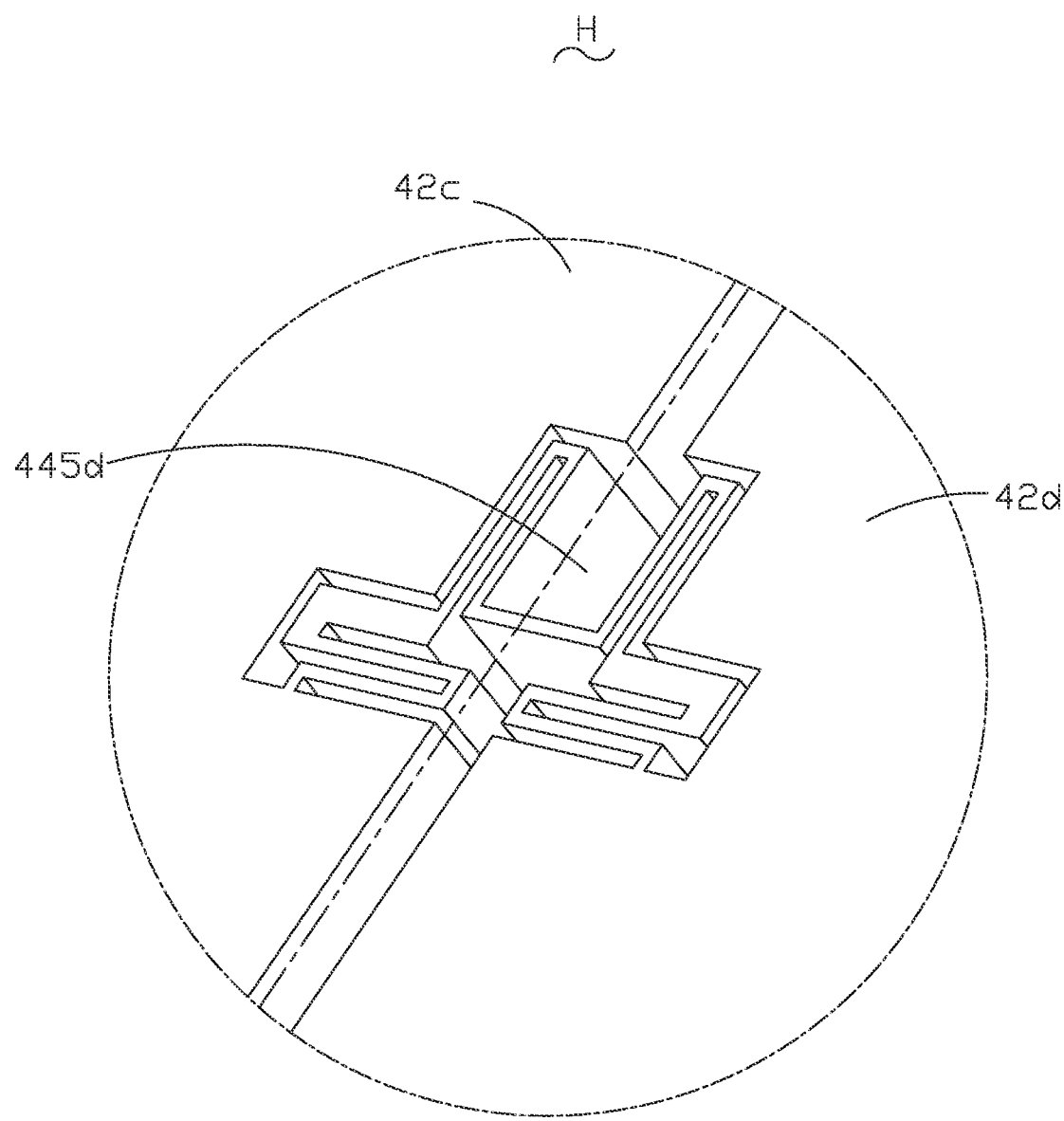
FIG. 14 is a partial enlarged view of part H shown in FIG. 1.

Please continue to refer to FIG. 11 in combination with FIG. 14. FIG. 14 is a partial enlarged view of H shown in FIG. 1. The connection assembly 44 also includes four second connection beams 445 for connecting between the four weights. The first weight 42a and the second weight 42b are connected by two second connection beams (445a and 445b) symmetrically distributed relative to the first flip axis D1. The two second connection beams (445a and 445b) are used to correlate the movement of the first weight 42a with the movement of the second weight 42b. Specifically, the first weight 42a and the second weight 42b are made to move in the same phase or in anti-phase.

The third weight 42c and the fourth weight 42d are connected by two second connection beams (445c and 445d) symmetrically distributed relative to the second flip axis D2. The two second connection beams (445c and 445d) are used to correlate the movement of the third weight 42c with the movement of the fourth weight 42d. Specifically, thus the third weight 42c and the fourth weight 42d move in the same phase or in the anti-phase.

It is understandable that the second connection beam (445a, 445b, 445c, and 445d) has a bent structure. Therefore, when the first weight 42a and the second weight 42b move in the same phase, the synchronization of the two weights can be ensured. When the first weight 42a and the second weight 42b perform Coriolis motion, the motion of the two weights can be linked. This way, differential detection can be realized better. The second connection beam 445 between the third weight 42c and the fourth weight 42d has the same function.

Figure 15:
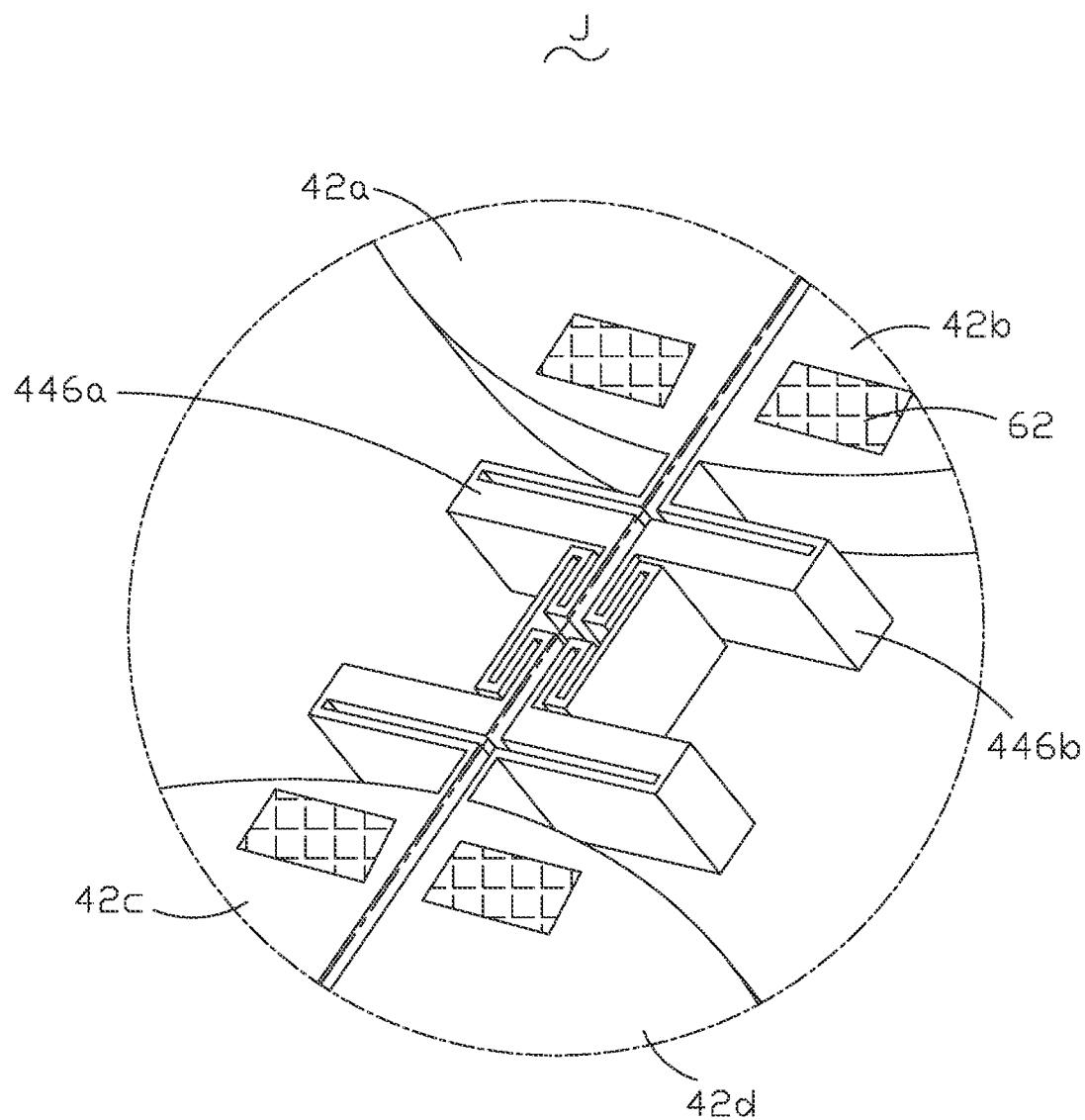
FIG. 15 is a partial enlarged view of part J shown in FIG. 1.

Please continue to refer to FIG. 11 in conjunction with FIG. 15. FIG. 15 is a partial enlarged view of J shown in FIG. 1. The connection assembly 44 also includes two third connection beams 446 symmetrically distributed relative to the second axis Y. The first weight 42a and the third weight 42c are connected by a third connection beam 446a. The third connection beam 446a is used to correlate the movement of the first weight 42a with the movement of the third weight 42c. Specifically, the first weight 42a and the third weight 42c are made to move in the same phase or in the anti-phase.

The second weight 42b and the fourth weight 42d are connected by a third connection beam 446b. The third connection beam 446 is used to correlate the movement of the second weight 42b with the movement of the fourth weight 42d. Specifically, the second weight 42b and the fourth weight 42d are made to move in the same phase or in the anti-phase.

It is understandable that the third connection beams 446a and 446b have a bent structure. When the first weight 42a and the third weight 42c perform Coriolis motion in the same phase or anti-phase, the third connection beam 446 can link the motion between the two weights, so that the motion of the two weights can be better linked.

Figure 16:
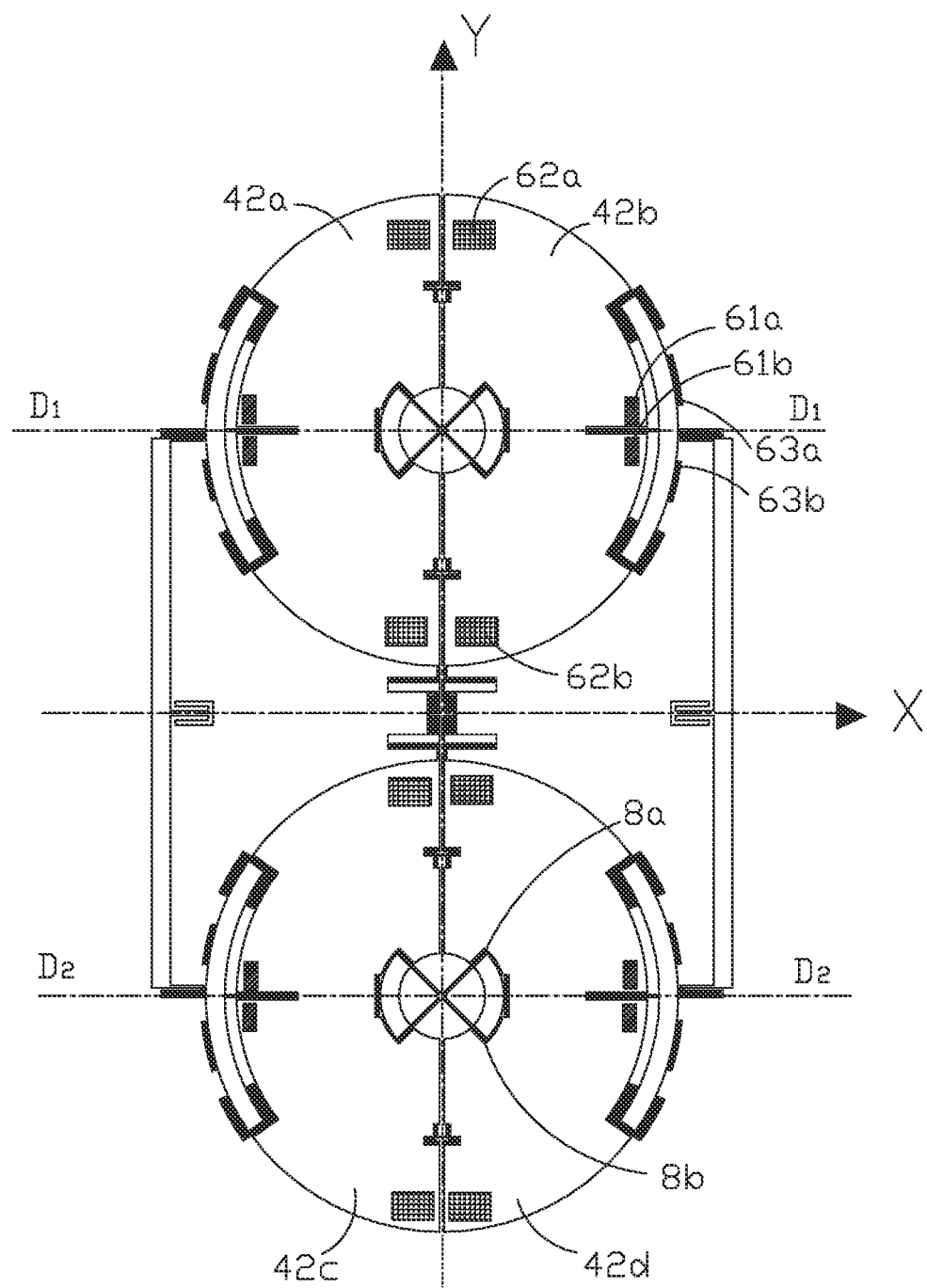
FIG. 16 is a schematic view of electrode arrangement in a three-axis micromachined gyroscope provided by the present invention.

Please refer to FIG. 16, which is a schematic view of electrode arrangement in a three-axis micromachined gyroscope provided by the present invention. Each of the first decoupling structure 4412 is provided with a plurality of the drive electrodes 8 used in cooperation. The drive electrode 8 extends along the radial direction of the weight. The multiple drive electrodes 8 on the same first decoupling structure 4412 are symmetrical relative to the flip axis D of each weight opposite to the first decoupling structure 4412. Wherein, the drive electrode 8 for driving the swing of the first weight 42a and the drive electrode driving the swing of second weight 42b are symmetrical relative the second axis Y. The drive electrode 8 for driving the swing of the third weight 42c and the drive electrode 8 for driving the swing of the fourth weight 42d are symmetrical relative the second axis Y.

Exemplarily, two drive electrodes 8 can be set on one weight. The drive electrodes 8a and 8b are set on the first decoupling structure 4412 and extend toward the weight. It should be noted that the drive electrodes 8a and 8b can be arranged on the side facing the weight, or a receiving groove can be provided on the first decoupling structure 4412 to place the drive electrode.

Alternatively, regardless of the influence of the weight movement on the drive, the drive electrode 8 can also be set on the weight instead of the drive electrode. The drive electrode 8 can be set on the side of the weight away from base 2 or on the side close to base 2.

It can be understood that the drive electrodes 8a and 8b drive the first decoupling structure 4412 to swing. The fourth connection beam 4414 is used to connect the first decoupling structure 4412 and the anchor 462, so that the first decoupling structure 4412 swings around the anchor 462. The first decoupling structure 4412 drives the weight movement through the fifth connection beam 4414.

Please continue to refer to FIG. 16. The detection part 6 includes multiple X axis detection units 61, multiple Y axis detection units 62, and multiple Z axis detection units 63. The X axis detection unit 61 is used to detect the position changes of the four weights when the three-axis micromachined gyroscope 100 receives the first axis X angular velocity. The Y axis detection unit 62 is used to detect the position changes of the four weights when the three-axis micromachined gyroscope 100 receives the angular velocity of second axis Y. The Z axis detection unit 63 is used to detect the position changes of the four weights when the three-axis micromachined gyroscope 100 receives the angular velocity of third axis Z.

Each of the weights is provided with a Y axis detection unit 62 and a Z axis detection unit 63. The X axis detection unit 61 is located at the edge of the weight away from the second axis Y. The Y axis detection unit 62 is located at the edge of the weight close to the second axis Y. The Z axis detection unit 63 is arranged on the side of the second decoupling structure 4441 close to the connection rod 442.

Exemplarily, two X axis detection units 61*a* and 61*b* can be set on each weight. The X axis detection unit 61 is located at the edge of the weight away from the second axis Y. And X axis detection unit 61*a* and X axis detection unit 61*b* are set symmetrically relative to the first flip axis D1. Two Y axis detection units 62*a* and 62*b* can also be set on each weight. The Y axis detection unit 62*a* and the Y axis detection unit 62*b* are arranged on the edge close to the second axis Y. In addition, the Y axis detection unit 62*a* and the Y axis detection unit 62*b* are symmetrically arranged relative to the first flip axis D1. Two Z axis detection units 63*a* and 63*b* can be set on each second decoupling structure 4441. Z axis detection unit 63*a* and Z axis detection unit 63*b* are set symmetrically relative to the first flip axis D1.

Optionally, the detection electrodes (such as 61*a* and 61*b*, 62*a* and 62*b*) constituting the detection unit can be arranged on the side of the weight close to the base 2, or on the side of the weight away from the base 2. Or both sides of the weight near base 2 and away from base 2 are arranged with detection electrodes. It is also possible to open a receiving slot in the weight to accommodate the detection electrode. The use of the containment tank can reduce the space and materials required for the three-axis micromachined gyroscope 100. Further, the weight can also be made into a frame structure, and the detection electrode can be directly connected to the weight in the frame structure.

The present invention provides a method for measuring angular velocity, which is applied to a three-axis micromachined gyroscope. the three-axis micromachined gyroscope includes a base, a vibration part connected to the base and suspended on the base, a drive electrode connected to the driving vibration part. a detection part connected with the vibration part. The vibration part includes a vibration assembly for receiving Coriolis force and generating a position change. The vibration assembly includes four weights. Please refer to FIG. 17. FIG. 17 is an angular velocity measurement method provided by the present invention. the measurement method includes:

501. Use the drive electrode to drive the four masses to swing in a plane parallel to the base. Wherein, the first weight and the second weight swing concentrically in anti-phase. The third weight and the fourth weight swing in concentrically anti-phase. The swing of the first weight and the swing of the third weight are in anti-phase. Or, the first weight and the second weight swing concentrically in same phase. The third weight and the fourth weight swing concentrically and in same phase. The swing of the first weight and the swing of the third weight are in anti-phase.

It should be noted that before use, the three-axis micromachined gyroscope is in a static state. At rest, first weight and second weight are related to the second axial symmetry, third weight and fourth weight are related to the second axial symmetry, first weight and third weight are related to the third axial symmetry, and the second weight and the fourth weight are related to the third axial symmetry. This symmetrical structure is conducive to the realization of the three-axis micromachined gyroscope's differential detection of the angular velocity of each axis.

502. Receive angular velocity, so that the four weights are subjected to Coriolis force, and the position changes under the action of Coriolis force.

503, the detection part detects the position changes of the four weights in the Coriolis force direction, and converts the position changes into electrical signal output.

504. Calculate the angular velocity as described in the electrical signal.

Compared with the prior art, regardless of the direction of the angular velocity to be detected, the angular velocity measurement method provided by the present invention allows all weights to be affected by Coriolis force and participate in Coriolis motion. In addition, the position change caused by the Coriolis motion can be detected by the detection part, while the detection sensitivity of the four-weight gyroscope in the prior art is low. It is because when detecting the angular velocity of some axes, only two weights are affected by Coriolis force. The remaining two weights are not subject to Coriolis force and do not perform Coriolis motion to produce position changes. Therefore, the angular velocity measurement method provided by the present invention can obtain a larger output electrical signal, thereby having higher sensitivity.

It should be noted that when the micromechanical gyroscope is used and installed, the base must be installed parallel to the ground. This can ensure that the direction and size of the measured angular velocity conform to the user's daily cognitive habits.

It is understandable that when the angular velocity input in two or three directions is received at the same time, the four weights will receive Coriolis force in multiple directions at the same time, and will cause position changes under the action of the Coriolis force.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A three-axis micromachined gyroscope, comprising:
a base;
a vibration part suspended by the base, comprising a vibration assembly for receiving Coriolis force and generating a position change, the vibration assembly comprising four weights symmetrically distributed and connected to each other for swing in a plane parallel to the base driven by the drive electrode;
a drive electrode for driving the vibration part;
a detection part connected with the vibration part for detecting position change of the weights after receiving Coriolis force, and converting the position change of the weight into an electrical signal for outputting; and
a swing center of each weight being outside the corresponding weight; wherein the four weights include a first weight, a second weight, a third weight, and a fourth weight; when the gyroscope is stationary, the first weight and the third weight are symmetrical with respect to a first axis;

the second weight and the fourth weight are symmetrical with respect to the first axis;

the first weight and the second weight are symmetrical with respect to a second axis perpendicular to the first axis; and the third weight and the fourth weight are symmetrical with respect to the second axis;

when the three-axis micromachined gyroscope receives an angular velocity, the swinging weight is subjected to Coriolis force and a corresponding position change occurs.

2. The three-axis micromachined gyroscope as described in claim 1, wherein the drive electrode drives the first weight and the second weight to swing in anti-phase; the drive electrode drives the third weight and the fourth weight to swing in anti-phase; the swing of the first weight and the swing of the third weight are in anti-phase;

when the three-axis micromachined gyroscope receives the angular velocity in the first axis direction, the four weights all rotate around the second axis; an overturn of the first weight and an overturn of the second weight are in same phase; an overturn of the third weight and an overturn of the fourth weight are in same phase; the overturn of the first weight and the overturn of the third weight are in anti-phase;

when the three-axis micromachined gyroscope receives the angular velocity in the second axis direction, the four weights all perform overturning movements around their respective flip axis; the flip axis passes through the swing center of the weight and is parallel to the first axis; the overturn of the first weight and the overturn of the second weight are in anti-phase; the overturn of the third weight and the overturn from the overturn of the fourth weight are in anti-phase; the overturn of the first weight and the overturn of the third weight are in anti-phase;

when the three-axis micromachined gyroscope receives an angular velocity that is perpendicular to both the first axis and the third axis of the second axis, the four weights all move along the first axis; the movement of the first weight and the movement of the second weight are in same phase; the movement of the third weight and the movement of the fourth weight are in same phase; the movement of the first weight and the movement of the third weight are in anti-phase.

3. The three-axis micromachined gyroscope as described in claim 1, wherein the drive electrode drives the first weight and the second weight to swing in same phase; the drive electrode drives the third weight and the fourth weight to swing in same phase; wherein, the swing of the first weight and the third weight are in anti-phase;

when the three-axis micromachined gyroscope receives the angular velocity in the first axis direction, the four weights all rotate around the second axis; an overturn of the first weight and the overturn of the second weight are in anti-phase; an overturn of the third weight and the overturn of the fourth weight are in anti-phase; the overturn of the first weight and the overturn of the third weight are in anti-phase;

when the three-axis micromachined gyroscope receives the angular velocity in the second axis direction, the four weights all perform a overturning movement around the flip axis; the flip axis passes through the swing center of the weight and is parallel to the first axis; the overturn of the first weight is in same phase with the overturn of the second weight, and the overturn of the third weight is in same phase with the overturn of the fourth weight; the overturn of the first weight and the overturn of the third weight are in anti-phase;

when the three-axis micromachined gyroscope receives an angular velocity that is perpendicular to the third axis direction of the first axis and the second axis at the same time, the four weights all move in the direction of the first axis; the movement of the first weight and the movement of the second weight are in anti-phase; the movement of the third weight and the movement of the fourth weight are in anti-phase; the movement of the first weight and the movement of the third weight are in anti-phase.

4. The three-axis micromachined gyroscope as described in claim 1, wherein the vibration part further comprises a fixing assembly for connecting the four weights to the base; the fixing assembly comprises two anchors for connecting the four weights and the base; the two anchors include a first anchor and a second anchor that are arranged along the second axis and distributed about the first axial symmetry;

the first weight and the second weight are both connected to the base through the first anchor; the third weight and the fourth weight are both connected to the base through the second anchor;

the first weight and the second mass both swing concentrically with the first anchor as the swing center; the third weight and the fourth weight both swing concentrically with the second anchor as the swing center.

5. The three-axis micromachined gyroscope as described in claim 4, wherein the vibration part further comprises a connection assembly for connecting the four weights; the connection assembly comprises an inner coupling member that connects each weight to the anchor corresponding to it; the inner coupling member comprises a first decoupling structure, a fourth connection beam connecting the anchor and the first decoupling structure, a fifth connection beam connecting the first decoupling structure and the weight;

when the drive electrode drives the weight to swing, the fourth connection beam and the first decoupling structure swing around the anchor; the first decoupling structure drives the weight to swing around the anchor through the fifth connection beam;

when the three-axis micromachined gyroscope receives the angular velocity in the first axis direction and the second axis direction, the fourth connection beam and the first decoupling structure do not move with the weight under the action of Coriolis;

when the three-axis micromachined gyroscope receives an angular velocity that is perpendicular to the first axis and the third axis of the second axis at the same time, the fourth connection beam and the first decoupling structure do not move with the weight under the action of Coriolis force motion.

6. The three-axis micromachined gyroscope as described in claim 4, wherein the connection assembly further comprises a first connection rod and a second connection rod distributed relative to the second axial symmetry; the first connection rod is arranged on a side of the first weight and the third weight away from the two anchors; the first connection rod is used to connect the first weight and the third weight; the fixing assembly further comprises a first support point located at the midpoint of the first connection rod; the first support point is used to connect the first connection rod and the base;

the second connection rod is arranged on a side of the second weight and the fourth weight away from the two anchors; the second connection rod is used to connect the second weight and the fourth weight; the fixing assembly further comprises a second support point located at the midpoint of the second connection rod; the second support point is used to connect the second connection rod and the base.

7. The three-axis micromachined gyroscope as described in claim 6, wherein the connection assembly further comprises four first connection beams and four outer coupling members for connecting the connection rod and the weight; each outer coupling member is connected to one of the first connection beams; each of the connection rods is connected to two of the first connection beams; each of the weights is connected to one of the first connection beams; and the first connection beam is located on the flip axis of each weight;

the first connection beam comprises a fixed part connected with the connection rod, and an extension part separated from the fixed part and connected with the weight; the outer coupling member comprises a second decoupling structure connected between the fixed part and the extension part, a sixth connection beam connecting the rear end of the second decoupling structure and the base;

when the drive electrode drives the weight to swing, the second decoupling structure, the fixed part, and the connection rod do not swing with the weight; when the three-axis micromachined gyroscope receives the angular velocity in the first axis direction and the second axis direction, the second decoupling structure, the fixed part, and the connection rod do not move with the weight under the action of Coriolis; when the three-axis micromachined gyroscope receives the angular velocity in the third axis direction, the second decoupling structure, the fixed part, and the connection rod move in the first axis direction.

8. The three-axis micromachined gyroscope as described in claim 5, wherein the drive electrode is arranged on each of the first decoupling structures.

9. The three-axis micromachined gyroscope as described in claim 1, wherein the detection part comprises multiple Z axis detection units for detecting changes in the positions of the four weights when the three-axis micromachined gyroscope receives angular velocities that are simultaneously perpendicular to the third axis of the first axis and the second axis;

the Z axis detection unit is arranged on the second decoupling structure.

10. A measuring method of angular velocity applied to a three-axis micromachined gyroscope, comprising a base, a vibration part connected to the base and suspended on the base, a drive electrode connected with the driving vibration part, and a detection part connected with the vibration part, the vibration part comprising a vibration assembly for receiving Coriolis force and generating a position change, the vibration assembly comprising four weights, wherein the method comprises steps of:

using the drive electrode to drive the four weights to swing in a plane parallel to the base; a first weight and a second weight swing concentrically in anti-phase; a third weight and a fourth weight swing in concentrically anti-phase; the swing of the first weight and the swing of the third weight are in anti-phase; or, the first weight and the second weight swing concentrically in same phase; the third weight and the fourth weight swing concentrically and in same phase; the swing of the first weight and the swing of the third weight are in anti-phase;

receiving an angular velocity for providing the four weights with Coriolis force such that position changes under the action of Coriolis force;

detecting position changes of the four weights in the Coriolis direction by the detection part, and converting the position changes into electrical signal output;

calculating the angular velocity according to the electrical signal.

\* \* \* \* \*